United States Patent
Sakurai et al.

(10) Patent No.: US 10,448,017 B2
(45) Date of Patent: *Oct. 15, 2019

(54) IMAGE PROCESSING DEVICE AND IMAGE PROCESSING METHOD FOR IMAGE DECODING BASED ON NON-SQUARE QUANTIZATION MATRIX

(71) Applicant: SONY CORPORATION, Tokyo (JP)

(72) Inventors: Hironari Sakurai, Tokyo (JP); Junichi Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,806

(22) Filed: Jun. 12, 2018

(65) Prior Publication Data

US 2018/0359474 A1 Dec. 13, 2018

Related U.S. Application Data

(63) Continuation of application No. 15/406,911, filed on Jan. 16, 2017, now Pat. No. 10,070,131, which is a (Continued)

(30) Foreign Application Priority Data

May 20, 2011 (JP) .................. 2011-113232
Oct. 27, 2011 (JP) .................. 2011-235828

(51) Int. Cl.
*H04N 19/122* (2014.01)
*H04N 19/126* (2014.01)
(Continued)

(52) U.S. Cl.
CPC ......... *H04N 19/122* (2014.11); *H04N 19/126* (2014.11); *H04N 19/129* (2014.11);
(Continued)

(58) Field of Classification Search
None
See application file for complete search history.

(56) References Cited

U.S. PATENT DOCUMENTS

| | | |
|---|---|---|
| 5,621,466 A | 4/1997 | Miyane et al. |
| 8,498,335 B2 | 7/2013 | Holcomb et al. |

(Continued)

FOREIGN PATENT DOCUMENTS

| | | |
|---|---|---|
| CN | 1299563 A | 6/2001 |
| CN | 1751511 A | 3/2006 |

(Continued)

OTHER PUBLICATIONS

Office Action for CN Patent Application No. 201280023109.6, dated Jul. 5, 2016, 15 pages of Office Action and 09 pages of English Translation.

(Continued)

*Primary Examiner* — Mohammed Jebari
(74) *Attorney, Agent, or Firm* — Chip Law Group

(57) ABSTRACT

There is provided an image processing device including a decoding section that decodes an encoded stream and generates quantized transform coefficient data, and an inverse quantization section that, taking transform coefficient data as transform units to be used during inverse orthogonal transform, inversely quantizes the quantized transform coefficient data decoded by the decoding section, such that in a case where a non-square transform unit is selected, the inverse quantization section uses a non-square quantization matrix, corresponding to a non-square transform unit, that is generated from a square quantization matrix corresponding to a square transform unit.

17 Claims, 31 Drawing Sheets

Related U.S. Application Data continuation of application No. 14/113,759, filed as application No. PCT/JP2012/059779 on Apr. 10, 2012, now Pat. No. 9,641,840.

(51) Int. Cl.

| | |
|---|---|
| *H04N 19/176* | (2014.01) |
| *H04N 19/625* | (2014.01) |
| *H04N 19/597* | (2014.01) |
| *H04N 19/46* | (2014.01) |
| *H04N 19/30* | (2014.01) |
| *H04N 19/134* | (2014.01) |
| *H04N 19/129* | (2014.01) |
| *H04N 19/61* | (2014.01) |

(52) U.S. Cl.
CPC ......... *H04N 19/134* (2014.11); *H04N 19/176* (2014.11); *H04N 19/30* (2014.11); *H04N 19/46* (2014.11); *H04N 19/597* (2014.11); *H04N 19/61* (2014.11); *H04N 19/625* (2014.11)

(56) References Cited

U.S. PATENT DOCUMENTS

| | | |
|---|---|---|
| 2006/0159165 A1 | 7/2006 | Lu et al. |
| 2007/0133889 A1 | 6/2007 | Horie et al. |
| 2007/0189626 A1 | 8/2007 | Tanizawa et al. |
| 2010/0086028 A1 | 4/2010 | Tanizawa et al. |
| 2011/0158315 A1 | 6/2011 | Kim et al. |
| 2012/0140815 A1 | 6/2012 | Zhou et al. |
| 2012/0189198 A1 | 7/2012 | Kuo et al. |
| 2012/0201300 A1 | 8/2012 | Kim et al. |
| 2013/0216149 A1 | 8/2013 | Sato |
| 2013/0251032 A1 | 9/2013 | Tanaka |
| 2014/0050262 A1 | 2/2014 | Sakurai et al. |
| 2014/0050267 A1 | 2/2014 | Sakurai et al. |
| 2014/0133547 A1 | 5/2014 | Tanaka |
| 2014/0177728 A1 | 6/2014 | Zhang et al. |
| 2015/0043816 A1 | 2/2015 | Tanaka |
| 2015/0063447 A1 | 3/2015 | Tanaka |
| 2017/0188030 A1 | 6/2017 | Sakurai et al. |

FOREIGN PATENT DOCUMENTS

| | | |
|---|---|---|
| CN | 101411192 A | 4/2009 |
| JP | 2004-254327 | 9/2004 |
| KR | 10-2005-0099964 A | 10/2005 |
| WO | 2004/077810 A2 | 9/2004 |

OTHER PUBLICATIONS

Zhang, et al., "Method and Syntax for Quantization Matrices Representation", Joint Collaborative Team on Video Coding (JCT-VCI of ITU-T SG16 WP3 and ISO/IEC JTC1/SC29NVGII, Document JCTVC-GI52, 7th Meeting, Nov. 21-30, 2011, 8 pages.

International Search Report and Written Opinion of PCT Application No. PCT/JP20121059779, dated Jul. 10, 2012, 06 pages of English Translation and 06 pages of ISRWO.

Zhou, et al., "Non-CE04: Carriage of Large Block Size Quantization Matrices with Up-sampling", Joint Collaborative Team on Video Coding (JCT-VCI of ITU-T SG16 WP3 and ISO/IEC JTC1/SC29NVGII, Document JCTVC-G094, No. M21642, 7th Meeting, Nov. 19-30, 2011, 6 pages.

Zhou, et al., "Compact Representation of Quantization Matrices for HEVC", Joint Collaborative Team on Video Coding (JCT-VC) of ITU-T SG16 WP3 and ISOIIEC JTC1/SC29NVGII, Document JCTVC-D024, No. m18763, th Meeting, Jan. 20-28, 2011, 9 pages.

"Test Model Under Consideration", Joint Collaborative Team on Video Coding (JCT-VC) of ITU-T SG16 WP3 and ISO/IEC JTC1/SC29NVGII, Document JCTVC-B205, 2nd Meeting, Jul. 21-28, 2010, 198 pages.

Cao, et al., "CE6.b1 Report on Short Distance Intra Prediction Method", Joint Collaborative Team on Video Coding (JCT-VC) of ITU-T SG 16 WP3 and ISO/IEC JTC 1/SC29NVG 11, Document JCTVC-E278. 5th Meeting, Mar. 16-23, 2011, 07 pages.

Non-Final Office Action for U.S. Appl. No. 15/406,911, dated May 25, 2017, 11 pages.

Final Office Action for U.S. Appl. No. 15/406,911, dated Sep. 7, 2017, 12 pages.

Advisory Action for U.S. Appl. No. 15/406,911, dated Nov. 28, 2017, 02 pages.

Notice of Allowance for U.S. Appl. No. 15/406,911, dated May 4, 2018, 7 pages.

International Preliminary Report on Patentability of PCT Application No. PCT/JP2012/059779, dated Nov. 28, 2013, 6 pages of English Translation and 3 pages of IPRP.

Non-Final Office Action for U.S. Appl. No. 14/113,759, dated Dec. 11, 2015, 10 pages.

Final Office Action for U.S. Appl. No. 14/113,759, dated May 24, 2016, 11 pages.

Advisory Action for U.S. Appl. No. 14/113,759, dated Aug. 15, 2016, 02 pages.

Notice of Allowance for U.S. Appl. No. 14/113,759, dated Dec. 21, 2016, 07 pages.

Office Action for CN Patent Application No. 201710222190.5, dated May 17, 2019, 08 pages of Office Action and 14 pages of English Translation.

Office Action for CN Patent Application No. 201710222211.3, dated Apr. 25, 2019, 06 pages of Office Action and 09 pages of English Translation.

FIG. 5

| PARAMETER NAME | DESCRIPTION |
|---|---|
| NON-SQUARE MATRIX FLAG | FLAG EXPRESSING WHETHER OR NOT TO USE NON-SQUARE QUANTIZATION MATRIX<br>E.G.) 0: NO, 1: YES |
| THE CASE OF USING NON-SQUARE QUANTIZATION MATRIX (FOR EACH NON-SQUARE QUANTIZATION MATRIX) | |
| GENERATION MODE (NON-SQUARE) | CLASSIFICATION EXPRESSING GENERATION MODE FOR NON-SQUARE QUANTIZATION MATRIX<br>E.G.) 0: FULL SCAN, 1: COPY, 2: TRANSPOSE |
| DIFFERENTIAL DATA | LINEAR ARRAY OF DIFFERENTIAL VALUES COMPUTED BY DPCM IN THE CASE OF FULL SCAN MODE |
| DESIGNATION MODE | CLASSIFICATION EXPRESSING DESIGNATION SCHEME IN THE CASE OF COPY MODE<br>E.G.) 0: DEFAULT, 1: COPY SOURCE ID,<br>2: DIRECTION+COPY SOURCE ID |
| COPY SOURCE ID | ROW ID OR COLUMN ID OF COPY SOURCE (OR A LIST OF THE SAME) |
| COPY SOURCE DIRECTION | CLASSIFICATION EXPRESSING DIRECTION OF COPY SOURCE<br>E.G.) 0: SAME DIRECTION, 1: DIFFERENT DIRECTION |
| RESIDUAL DATA | LINEAR ARRAY OF RESIDUAL VALUES FOR EACH ELEMENT IN THE CASE OF COPY MODE OR TRANSPOSE MODE |

EXAMPLE OF QUANTIZATION MATRIX PARAMETERS

FIG. 6A

SQUARE QUANTIZATION MATRIX (8×8)
$M_{S8}$

|   | 0 | 1 | 2 | 3 | 4 | 5 | 6 | 7 |
|---|---|---|---|---|---|---|---|---|
| 0 | e00 | e01 | e02 | e03 | e04 | e05 | e06 | e07 |
| 1 | e10 | e11 | e12 | e13 | e14 | e15 | e16 | e17 |
| 2 | e20 | e21 | e22 | e23 | e24 | e25 | e26 | e27 |
| 3 | e30 | e31 | e32 | e33 | e34 | e35 | e36 | e37 |
| 4 | e40 | e41 | e42 | e43 | e44 | e45 | e46 | e47 |
| 5 | e50 | e51 | e52 | e53 | e54 | e55 | e56 | e57 |
| 6 | e60 | e61 | e62 | e63 | e64 | e65 | e66 | e67 |
| 7 | e70 | e71 | e72 | e73 | e74 | e75 | e76 | e77 |

NON-SQUARE QUANTIZATION MATRIX (2×8)
$M_{NS28}$

| e00 | e01 | e02 | e03 | e04 | e05 | e06 | e07 |
|-----|-----|-----|-----|-----|-----|-----|-----|
| e40 | e41 | e42 | e43 | e44 | e45 | e46 | e47 |

GENERATION MODE: "1: COPY"
DESIGNATION MODE: "0: DEFAULT"
DEFAULT COPY SOURCE: 0TH ROW, 4TH ROW

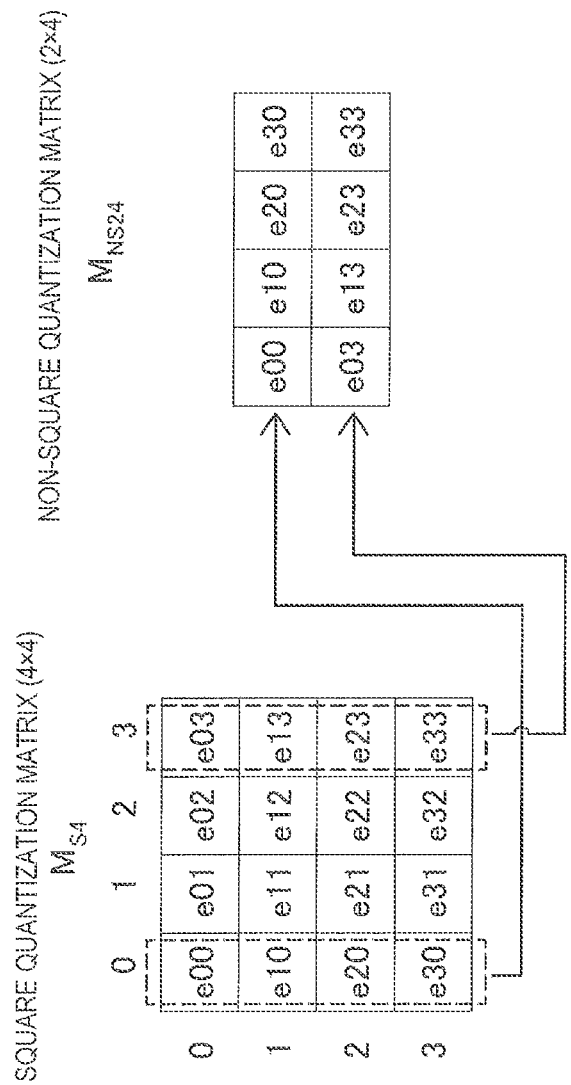

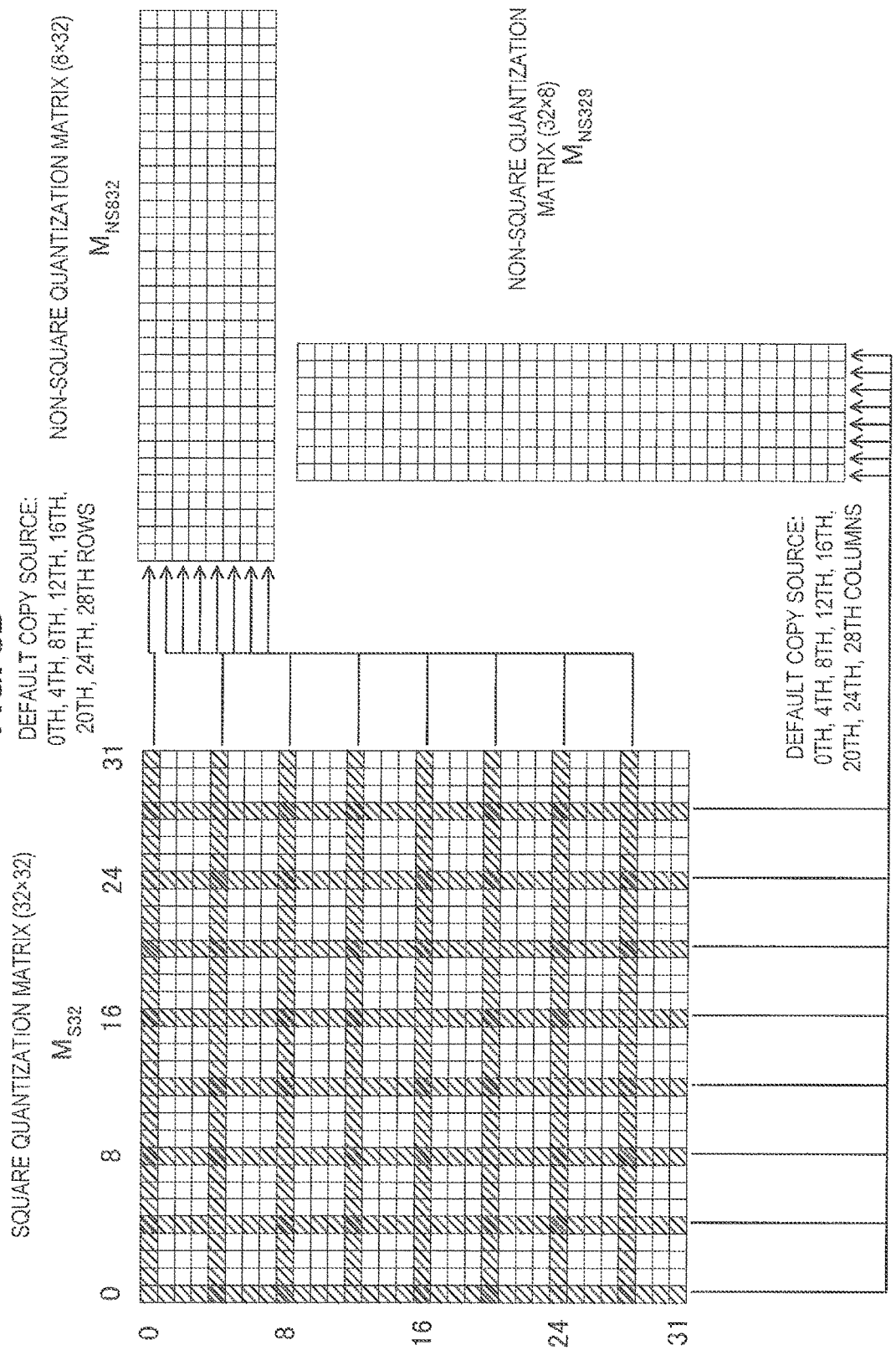

FIG. 9
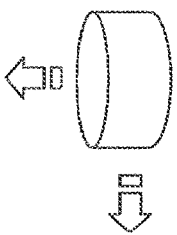
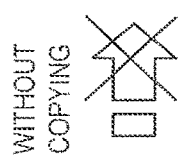
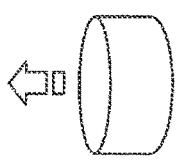

IMAGE PROCESSING DEVICE AND IMAGE PROCESSING METHOD FOR IMAGE DECODING BASED ON NON-SQUARE QUANTIZATION MATRIX

CROSS-REFERENCE TO RELATED APPLICATION

The present application is a continuation application of U.S. patent application Ser. No. 15/406,911, filed Jan. 16, 2017, which is a continuation application of U.S. patent application Ser. No. 14/113,759, filed Oct. 24, 2013, now U.S. Pat. No. 9,641,840, which is a national stage entry of PCT/JP2012/059779, filed Apr. 10, 2012, which claims priority from prior Japanese Priority Patent Application JP 2011-235828 filed in the Japan Patent Office on Oct. 27, 2011, which claims priority from prior Japanese Priority Patent Application JP 2011-113232 filed in the Japan Patent Office on May 20, 2011, the entire contents of which are hereby incorporated by reference.

TECHNICAL FIELD

The present disclosure relates to an image processing device and an image processing method.

BACKGROUND ART

In H.264/AVC, one of the standard specifications for image encoding schemes, it is possible to use different quantization steps for each component of the orthogonal transform coefficients when quantizing image data in the High Profile or higher profile. A quantization step for each component of the orthogonal transform coefficients may be set on the basis of a quantization matrix (also called a scaling list) defined at the same size as the units of orthogonal transform, and a standard step value.

FIG. 28 illustrates four classes of default quantization matrices which are predefined in H.264/AVC. The matrix SL1 is the default 4×4 quantization matrix for intra prediction mode. The matrix SL2 is the default 4×4 quantization matrix for inter prediction mode. The matrix SL3 is the default 8×8 quantization matrix for intra prediction mode. The matrix SL4 is the default 8×8 quantization matrix for inter prediction mode. The user may also define one's own quantization matrix that differs from the default matrices illustrated in FIG. 28 in the sequence parameter set or the picture parameter set. Note that in the case where no quantization matrix is specified, a flat quantization matrix having an equal quantization step for all components may be used.

In High Efficiency Video Coding (HEVC), whose standardization is being advanced as a next-generation image encoding scheme to succeed H.264/AVC, there is introduced the concept of a coding unit (CU), which corresponds to a macroblock of the past (see Non-Patent Literature 1 below). Furthermore, one coding unit may be split into one or more prediction units (PUs), which signify the units of a prediction process. Intra prediction or inter prediction is then conducted on each prediction unit. In addition, one coding unit may be split into one or more transform units (TUs), which signify the units of orthogonal transform. Each transform unit is then subjected to an orthogonal transform from image data into transform coefficient data, and the transform coefficient data is quantized. Non-Patent Literature 2 below proposes a technique called the short distance intra prediction method, which enables the selection of comparatively small-size, non-square prediction units (line or rectangle prediction units, for example) in intra prediction modes. In this case, the shapes of the transform units may also become non-square to match the shapes of the prediction units.

CITATION LIST

Non-Patent Literature

Non-Patent Literature 1: JCTVC-B205, "Test Model under Consideration", ITU-T SG16 WP3 and ISO/IEC JTC1/SC29/WG11 2nd Meeting: Geneva, 21-28 Jul. 2010

Non-Patent Literature 2: JCTVC-E278, "CE6.b1 Report on Short Distance Intra Prediction Method", ITU-T SG16 WP3 and ISO/IEC JTC1/SC29/WG11 5th Meeting: Geneva, 16-23 Mar. 2011

SUMMARY OF INVENTION

Technical Problem

However, as the selectable types of shapes and sizes for transform units increase, the number of corresponding quantization matrices also increases, and the increase in bit rate due to the quantization matrices may instead lead to lowered coding efficiency. Consequently, it is desirable to provide a mechanism that does not significantly lower coding efficiency, even if there is an increase in candidates for the quantization matrix to use.

Solution to Problem

According to an embodiment of the present disclosure, there is provided an image processing device including a decoding section that decodes an encoded stream and generates quantized transform coefficient data, and an inverse quantization section that, taking transform coefficient data as transform units to be used during inverse orthogonal transform, inversely quantizes the quantized transform coefficient data decoded by the decoding section, such that in a case where a non-square transform unit is selected, the inverse quantization section uses a non-square quantization matrix, corresponding to a non-square transform unit, that is generated from a square quantization matrix corresponding to a square transform unit.

The above image processing device typically may be realized as an image decoding device that decodes images.

Further, according to an embodiment of the present disclosure, there is provided an image processing method including decoding an encoded stream and generating quantized transform coefficient data, and taking transform coefficient data as transform units to be used during inverse orthogonal transform, inversely quantizing the decoded quantized transform coefficient data, such that in a case where a non-square transform unit is selected, a non-square quantization matrix corresponding to a non-square transform unit is used, the non-square quantization matrix being generated from a square quantization matrix corresponding to a square transform unit.

Advantageous Effects of Invention

As described above, according to the present disclosure, there is provided a mechanism that does not significantly lower coding efficiency, even if there is an increase in candidates for the quantization matrix to use as a result of an increase in the selectable types of transform units.

BRIEF DESCRIPTION OF DRAWINGS

FIG. 5 is an explanatory diagram illustrating an example of parameters for generating a quantization matrix.

FIG. 6A is a first explanatory diagram for explaining the generation of a non-square quantization matrix in a copy mode.

FIG. 6C is a third explanatory diagram for explaining the generation of a non-square quantization matrix in a copy mode.

FIG. 8B is a second explanatory diagram for explaining a simplified technique for generating non-square quantization matrices.

FIG. 9 is an explanatory diagram for explaining a technique for generating non-square quantization matrices in the case of using a default square quantization matrix.

DESCRIPTION OF EMBODIMENTS

Figure 1:
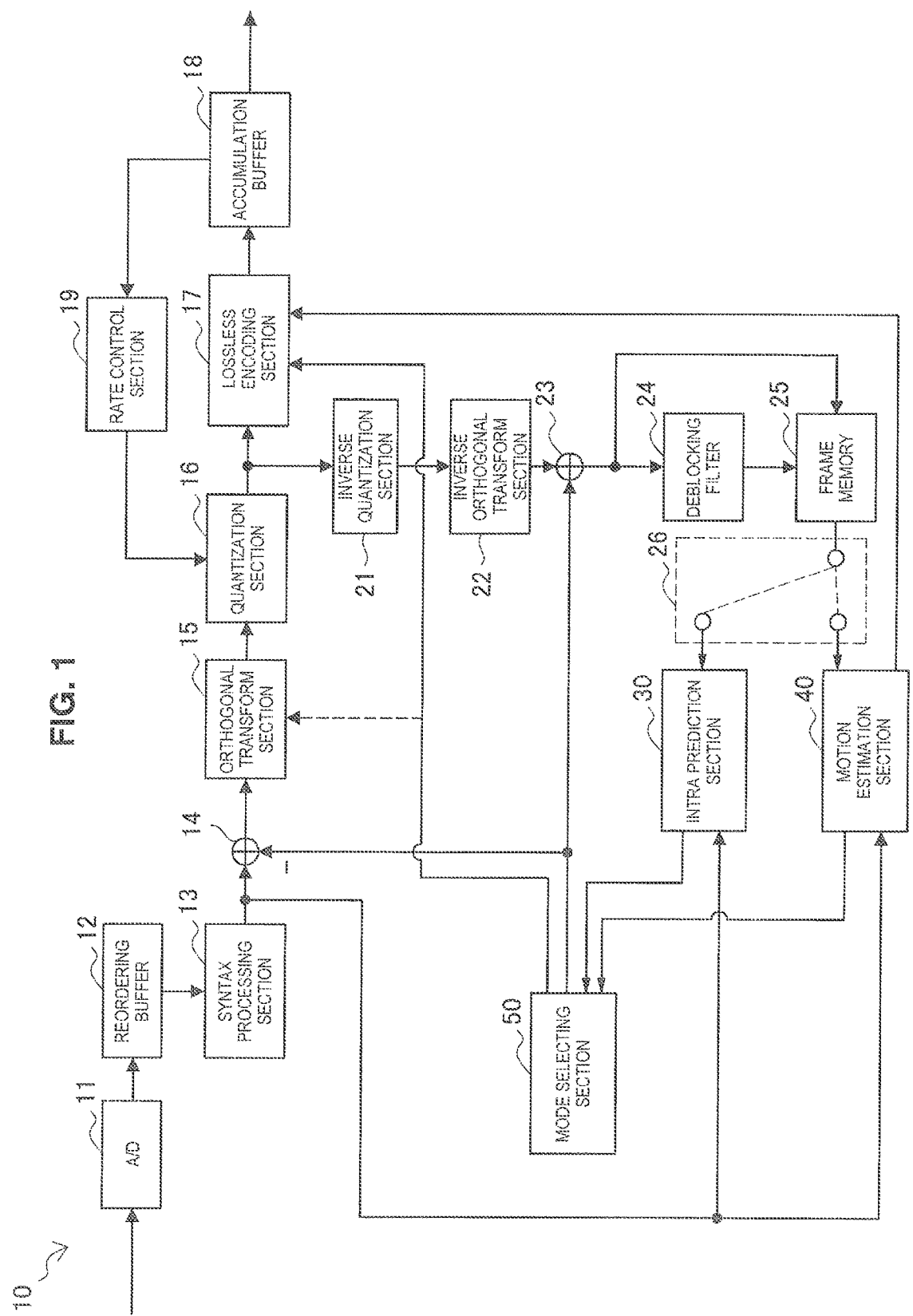
FIG. 1 is a block diagram illustrating an exemplary configuration of an image encoding device according to an embodiment.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, the description will proceed in the following order.
1. Exemplary configuration of image encoding device according to embodiment
   1-1. Exemplary overall configuration
   1-2. Exemplary configuration of syntax processing section
   1-3. Exemplary configuration of orthogonal transform section
   1-4. Exemplary configuration of quantization section
   1-5. Exemplary parameter structure
   1-6. Examples of generating non-square quantization matrices
   1-7. Examples of scan patterns
2. Process flow during encoding according to embodiment
3. Exemplary configuration of image decoding device according to embodiment
   3-1. Exemplary overall configuration
   3-2. Exemplary configuration of syntax processing section
   3-3. Exemplary configuration of inverse quantization section
   3-4. Exemplary configuration of inverse orthogonal transform section
4. Process flow during decoding according to embodiment
5. Application to various codecs
   5-1. Multiview codec
   5-2. Scalable codec
6. Applications
7. Conclusion 1. Exemplary Configuration of Image Encoding Device According to Embodiment This section describes an exemplary configuration of an image encoding device according to an embodiment.

[1-1. Exemplary Overall Configuration]

FIG. 1 is a block diagram illustrating an exemplary configuration of an image encoding device 10 according to an embodiment. Referring to FIG. 1, the image encoding device 10 is equipped with an analog-to-digital (A/D) conversion section 11, a reordering buffer 12, a syntax processing section 13, a subtraction section 14, an orthogonal transform section 15, a quantization section 16, a lossless encoding section 17, an accumulation buffer 18, a rate control section 19, an inverse quantization section 21, an inverse orthogonal transform section 22, an addition section 23, a deblocking filter 24, frame memory 25, a selector 26, an intra prediction section 30, a motion estimation section 40, and a mode selecting section 50.

The A/D conversion section 11 converts an image signal input in an analog format into image data in a digital format, and outputs a sequence of digital image data to the reordering buffer 12.

The reordering buffer 12 reorders the images included in the sequence of image data input from the A/D conversion section 11. After reordering the images according to a group of pictures (GOP) structure in accordance with the encoding process, the reordering buffer 12 outputs the reordered image data to the syntax processing section 13.

The image data output from the reordering buffer 12 to the syntax processing section 13 is mapped to a bitstream in units called Network Abstraction Layer (NAL) units. The stream of image data includes one or more sequences. The leading picture in a sequence is called the instantaneous decoding refresh (IDR) picture. Each sequence includes one or more pictures, and each picture further includes one or more slices. In H.264/AVC and HEVC, these slices are the basic units of image encoding and decoding. The data for each slice is recognized as a Video Coding Layer (VCL) NAL unit.

The syntax processing section 13 sequentially recognizes the NAL units in the stream of image data input from the reordering buffer 12, and inserts non-VCL NAL units storing header information into the stream. The non-VCL NAL units that the syntax processing section 13 inserts into the stream include sequence parameter sets (SPSs) and picture parameter sets (PPSs). The header information stored in SPS and PSP include, for example, a parameter related to a quantization matrix later described (hereinafter referred to as a quantization matrix parameter). Note that another new parameter set different from SPS and PPS may be set. For example, the syntax processing section 13 may insert into the stream a quantization matrix parameter set (QMPS), which stores only the quantization matrix parameters. The syntax processing section 13 also adds a slice header (SH) at the beginning of the slices. The syntax processing section 13 then outputs the stream of image data including VCL NAL units and non-VCL NAL units to the subtraction section 14, the intra prediction section 30, and the motion estimation section 40. A detailed configuration of the syntax processing section 13 will be further described later.

The subtraction section 14 is supplied with the image data input from the syntax processing section 13, and predicted image data selected by the mode selecting section 50 described later. The subtraction section 14 calculates prediction error data, which is the difference between the image data input from the syntax processing section 13 and the predicted image data input from the mode selecting section 50, and outputs the calculated prediction error data to the orthogonal transform section 15.

The orthogonal transform section 15 sets transform units in an image to be encoded, and generates transform coefficient data by orthogonally transforming image data for each transform unit. In the present embodiment, the shape of a transform unit set by the orthogonal transform section 15 may be square or non-square. The edge size of a square transform unit may be a size such as 4 pixels, 8 pixels, 16 pixels, or 32 pixels. The size of the long edge of a non-square transform unit likewise may be a size such as 4 pixels, 8 pixels, 16 pixels, or 32 pixels, and the ratio of the size of the long edge to the size of the short edge may be a ratio such as 2:1, 4:1, or 8:1. The image data subjected to an orthogonal transform by the orthogonal transform section 15 is prediction error data input from the subtraction section 14. The orthogonal transform by the orthogonal transform section 15 may be conducted according to an arbitrary orthogonal transform scheme, such as a discrete cosine transform (DCT) scheme, a discrete sine transform (DST) scheme, a Hadamard transform scheme, or a Karhunen-Loeve transform scheme, for example. The orthogonal transform section 15 outputs transform coefficient data transformed from prediction error data via an orthogonal transform process to the quantization section 16. A detailed configuration of the orthogonal transform section 15 will be further described later.

Figure 28:
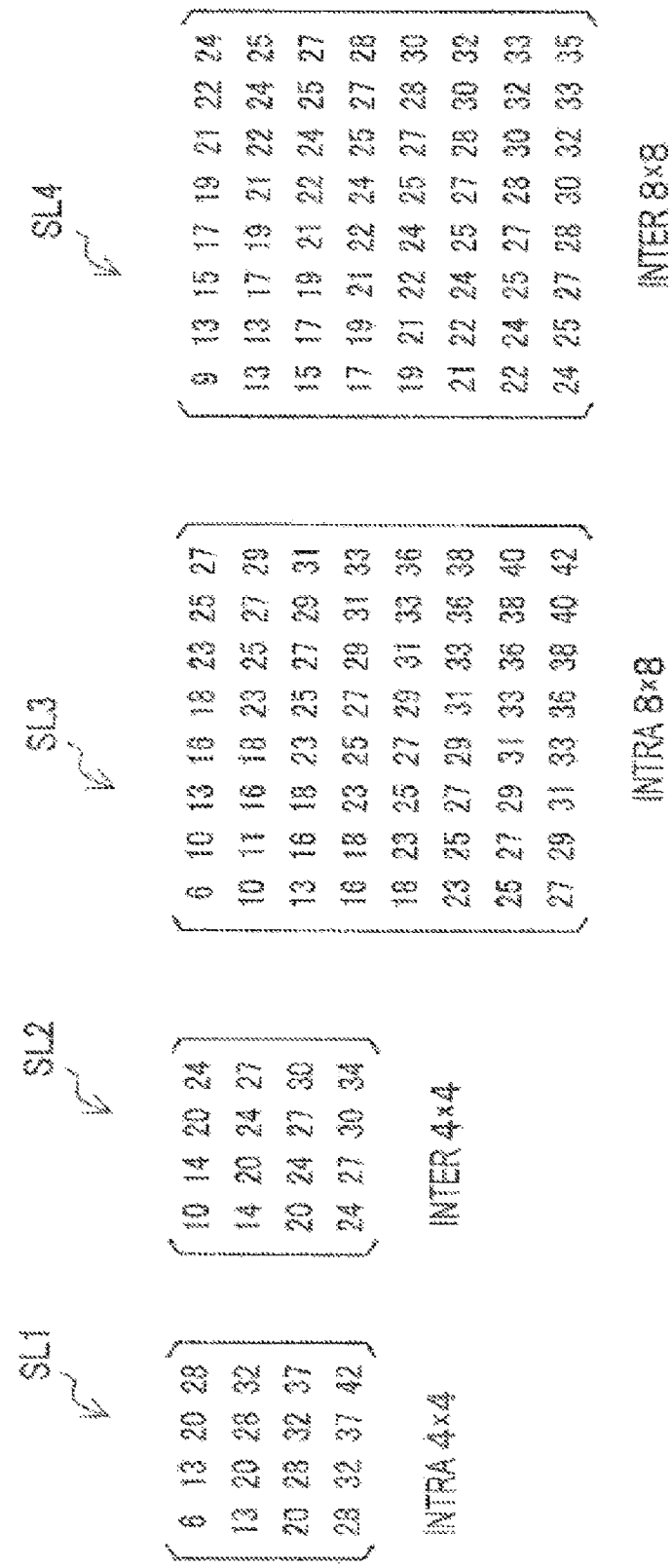
FIG. 28 is an explanatory diagram illustrating default quantization matrices which are predefined in H.264/AVC.

The quantization section 16 uses a quantization matrix corresponding to each transform unit to quantize the transform coefficient data in each transform unit input from the orthogonal transform section 15, and outputs the quantized transform coefficient data (hereinafter referred to as quantized data) to the lossless encoding section 17 and the inverse quantization section 21. The bit rate of the quantized data is controlled on the basis of a rate control signal from the rate control section 19. The quantization matrix used by the quantization section 16 is defined in an SPS, PPS, or some other parameter set, and may be specified in the slice header for each slice. It is also possible to use a default quantization matrix like those exemplified in FIG. 28 instead of defining a quantization matrix in a parameter set. In this case, the parameters for defining a quantization matrix become unnecessary. A detailed configuration of the quantization section 16 will be further described later.

The lossless encoding section 17 generates an encoded stream by encoding quantized data input from the quantization section 16. In addition, the lossless encoding section 17 encodes quantization matrix parameters inserted into a stream by the syntax processing section 13, and multiplexes the encoded parameters into the encoded stream. Furthermore, the lossless encoding section 17 encodes information about intra prediction or information about inter prediction input from the mode selecting section 50, and multiplexes the encoded information into the encoded stream. Typically, the encoding by the lossless encoding section 17 is lossless variable-length encoding based on a scheme such as arithmetic coding, Golomb coding, or Huffman coding. The lossless encoding section 17 then outputs the encoded stream thus generated to the accumulation buffer 18.

The accumulation buffer 18 uses a storage medium such as semiconductor memory to temporarily buffer the encoded stream input from the lossless encoding section 17. The accumulation buffer 18 then outputs the encoded stream thus buffered to a transmission section not illustrated (such as a communication interface or a connection interface with peripheral equipment, for example), at a rate according to the bandwidth of the transmission channel.

The rate control section 19 monitors the free space in the accumulation buffer 18. Then, the rate control section 19 generates a rate control signal according to the free space in the accumulation buffer 18, and outputs the generated rate control signal to the quantization section 16. For example, when there is not much free space in the accumulation buffer 18, the rate control section 19 generates a rate control signal for lowering the bit rate of the quantized data. Also, when there is sufficient free space in the accumulation buffer 18, for example, the rate control section 19 generates a rate control signal for raising the bit rate of the quantized data.

The inverse quantization section 21 performs an inverse quantization process on the quantized data input from the quantization section 16, using the same quantization matrix as the one set during the quantization process by the quantization section 16. The inverse quantization section 21 then outputs transform coefficient data acquired by the inverse quantization process to the inverse orthogonal transform section 22.

The inverse orthogonal transform unit 22 restores the prediction error data by applying an inverse orthogonal transform to the transform coefficient data input from the inverse quantization section 21. The orthogonal transform method used by the inverse orthogonal transform section 22 is equal to the method selected during the orthogonal transform process by the orthogonal transform section 15. The inverse orthogonal transform section 22 then outputs the restored prediction error data to the addition section 23.

The addition section 23 adds the restored prediction error data input from the inverse orthogonal transform section 22 and the predicted image data input from the mode selecting section 50 to thereby generate decoded image data. Then, the addition section 23 outputs the decoded image data thus generated to the deblocking filter 24 and the frame memory 25.

The deblocking filter 24 applies filtering to reduce blocking artifacts produced at the time of image encoding. The deblocking filter 24 removes blocking artifacts by filtering the decoded image data input from the addition section 23, and outputs the decoded image data thus filtered to the frame memory 25.

The frame memory 25 uses a storage medium to store the decoded image data input from the addition section 23 and the decoded image data after filtering input from the deblocking filter 24.

The selector 26 reads, from the frame memory 25, unfiltered decoded image data to be used for intra prediction, and supplies the decoded image data thus read to the intra prediction section 30 as reference image data. Also, the selector 26 reads, from the frame memory 25, the filtered decoded image data to be used for inter prediction, and supplies the decoded image data thus read to the motion estimation section 40 as reference image data.

The intra prediction section 30 performs an intra prediction process in each intra prediction mode, on the basis of the image data to be encoded that is input from the syntax processing section 13, and the decoded image data supplied via the selector 26. For example, the intra prediction section 30 evaluates the prediction result of each intra prediction mode using a predetermined cost function. Then, the intra prediction section 30 selects the intra prediction mode yielding the smallest cost function value, that is, the intra prediction mode yielding the highest compression ratio, as the optimal intra prediction mode. The intra prediction section 30 then outputs the predicted image data, information about intra prediction including the selected optimal intra prediction mode or the like, and the cost function value, to the mode selecting section 50.

The motion estimation section 40 performs an inter prediction process (prediction process between frames) on the basis of image data to be encoded that is input from the syntax processing section 13, and decoded image data supplied via the selector 26. For example, the motion estimation section 40 evaluates the prediction result of each prediction mode using a predetermined cost function. Then, the motion estimation section 40 selects the prediction mode yielding the smallest cost function value, that is, the prediction mode yielding the highest compression ratio, as the optimal prediction mode. The motion estimation section 40 generates predicted image data according to the optimal prediction mode. The motion estimation section 40 outputs the predicted image data, information about inter prediction including the selected optimal prediction mode or the like, and the cost function value, to the mode selecting section 50.

The mode selecting section 50 compares the cost function value related to intra prediction input from the intra prediction section 30 to the cost function value related to inter prediction input from the motion estimation section 40. Then, the mode selecting section 50 selects the prediction method with the smaller cost function value between intra prediction and inter prediction. In the case of selecting intra prediction, the mode selecting section 50 outputs the information about intra prediction to the lossless encoding section 17, and also outputs the predicted image data to the subtraction section 14 and the addition section 23. Also, in the case of selecting inter prediction, the mode selecting section 50 outputs the information about inter prediction described above to the lossless encoding section 17, and also outputs the predicted image data to the subtraction section 14 and the addition section 23.

[1-2. Exemplary Configuration of Syntax Processing Section]

Figure 2:
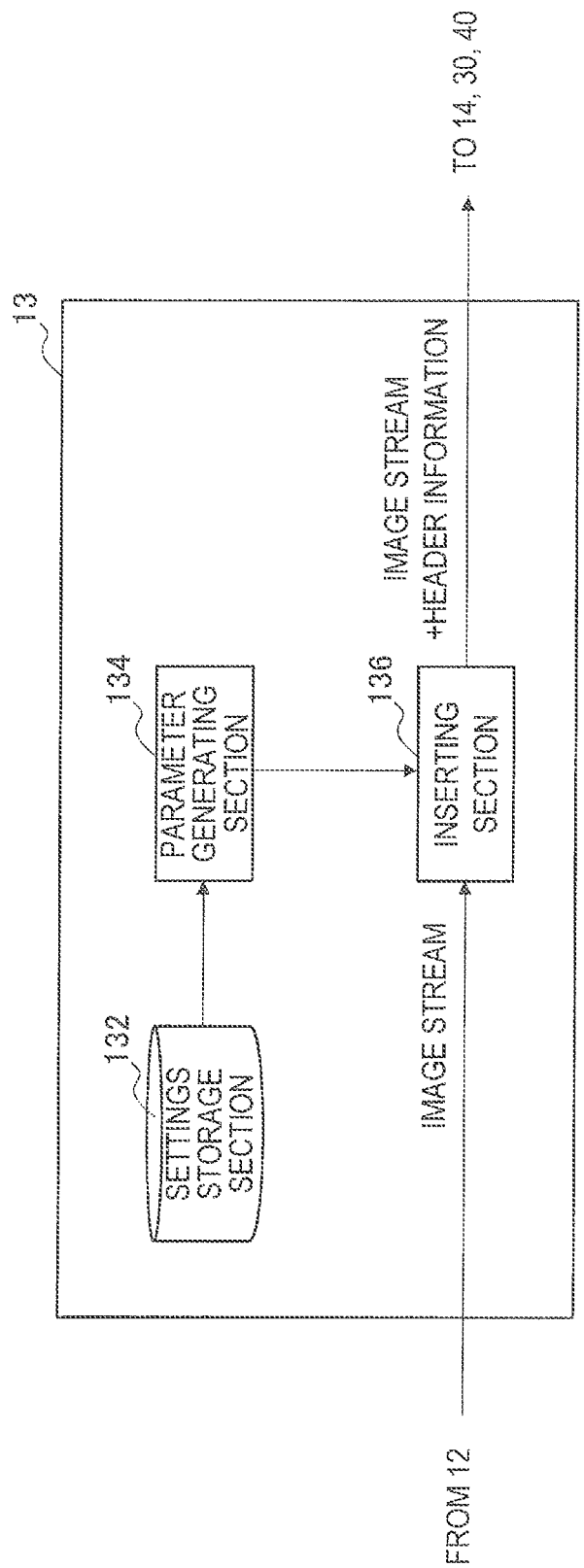
FIG. 2 is a block diagram illustrating an example of a detailed configuration of the syntax processing section illustrated in FIG. 1.

FIG. 2 is a block diagram illustrating an example of a detailed configuration of the syntax processing section 13 of the image encoding device 10 illustrated in FIG. 1. Referring to FIG. 2, the syntax processing section 13 includes a settings storage section 132, a parameter generating section 134, and an inserting section 136.

(1) Settings Storage Section

The settings storage section 132 stores various settings used for the encoding process by the image encoding device 10. For example, the settings storage section 132 stores information such as a profile for each sequence in the image data, the encoding mode for each picture, data regarding the GOP structure, as well as coding unit, prediction unit, and transform unit settings. Also, in the present embodiment, the settings storage section 132 stores settings regarding quantization matrices used by the quantization section 16 (and the inverse quantization section 21). These settings may be predetermined for each slice, typically on the basis of offline image analysis.

(2) Parameter Generating Section

The parameter generating section 134 generates parameters defining settings stored by the settings storage section 132, and outputs the generated parameters to the inserting section 136.

For example, in the present embodiment, the parameter generating section 134 generates quantization matrix parameters for generating quantization matrices used as candidates by the quantization section 16. The quantization matrix candidates used by the quantization section 16 include quantization matrices corresponding to each of the types of transform units which may be set in an image. In the present embodiment, the types of transform units are classified at least according to combinations of transform unit shapes and sizes. An example of quantization matrix parameters generated by the parameter generating section 134 will be further described later.

(3) Inserting Section

The inserting section 136 inserts header information, such as SPSs, PPSs, and slice headers that respectively include parameter groups generated by the parameter generating section 134, into the stream of image data input from the reordering buffer 12. The header information inserted into the stream of image data by the inserting section 136 includes the quantization matrix parameters generated by the parameter generating section 134. The inserting section 136 then outputs the stream of image data with inserted header information to the subtraction section 14, the intra prediction section 30, and the motion estimation section 40.

[1-3. Exemplary Configuration of Orthogonal Transform Section]

Figure 3:
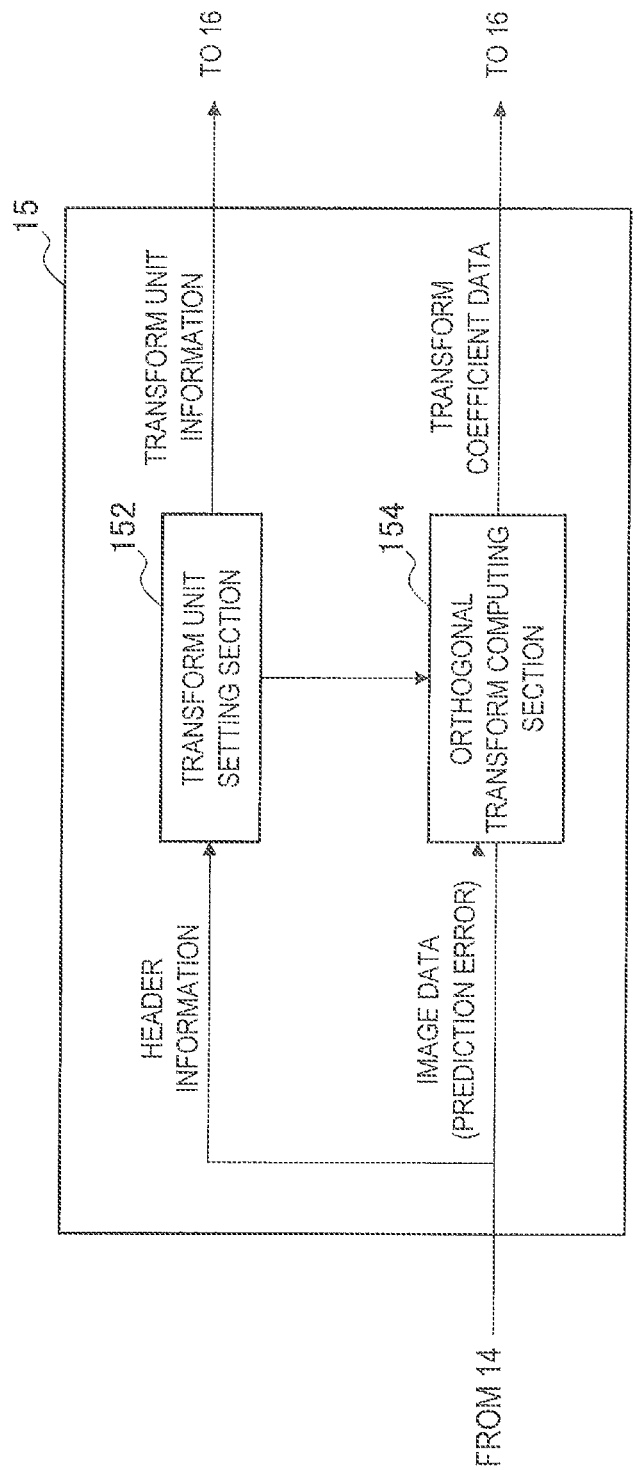
FIG. 3 is a block diagram illustrating an example of a detailed configuration of the orthogonal transform section illustrated in FIG. 1.

FIG. 3 is a block diagram illustrating an example of a detailed configuration of the orthogonal transform section 15 of the image encoding device 10 illustrated in FIG. 1. Referring to FIG. 3, the orthogonal transform section 15 includes a transform unit setting section 152 and an orthogonal transform computing section 154.

(1) Transform Unit Setting Section

The transform unit setting section 152 sets a transform unit in an image, to be used when orthogonally transforming image data to be encoded. The shape of a transform unit set by the transform unit setting section 152 may be square or non-square. For example, in the case where the intra prediction section 30 uses the short distance intra prediction method discussed earlier, the transform unit setting section 152 may set a non-square transform unit of the same size as a prediction unit in an image when a non-square prediction unit is selected as the prediction unit.

(2) Orthogonal Transform Computing Section

The orthogonal transform computing section 154 generates transform coefficient data by orthogonally transforming prediction error data input from the subtraction section 14 for each transform unit set in an image by the transform unit setting section 152. The orthogonal transform computing section 154 then outputs the generated transform coefficient data to the quantization section 16. In addition, the transform unit setting section 152 outputs transform unit information specifying the set transform unit to the quantization section 16.

[1-4. Exemplary Configuration of Quantization Section]

Figure 4:
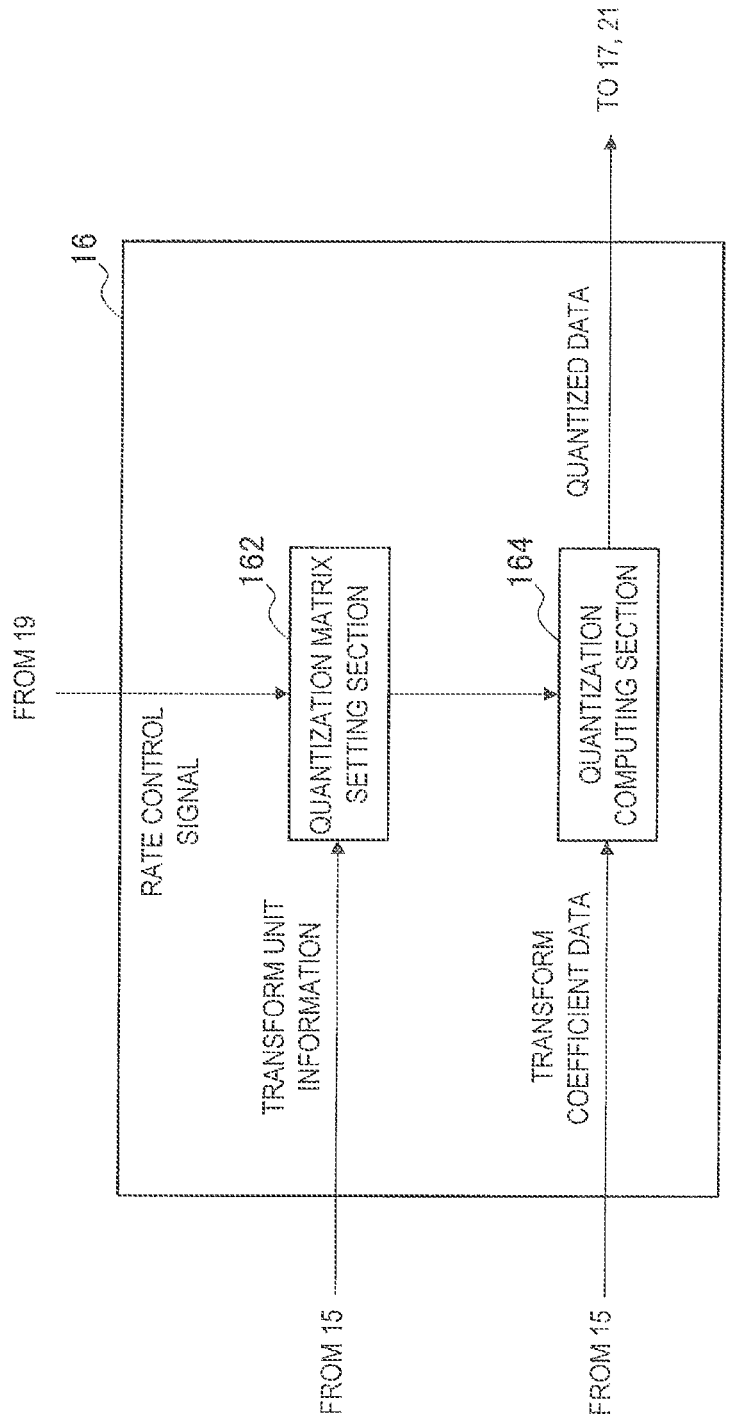
FIG. 4 is a block diagram illustrating an example of a detailed configuration of the quantization section illustrated in FIG. 1.

FIG. 4 is a block diagram illustrating an example of a detailed configuration of the quantization section 16 of the image encoding device 10 illustrated in FIG. 1. Referring to FIG. 4, the quantization section 16 includes a quantization matrix setting section 162 and a quantization computing section 164.

(1) Quantization Matrix Setting Section

For each transform unit set by the orthogonal transform section 15, the quantization matrix setting section 162 sets a quantization matrix for quantizing transform coefficient data generated by orthogonal transform. For example, the quantization matrix setting section 162 first acquires transform unit information from the orthogonal transform section 15. The transform unit information may be information specifying the position of a partition dividing each coding unit into one or more transform units. Additionally, the transform unit information may be information specifying a prediction unit instead of a transform unit in the case where the prediction units and the transform units are equal.

The quantization matrix setting section 162 recognizes the shape and size of each transform unit from the acquired transform unit information, and sets a quantization matrix corresponding to the recognized shape and size for each transform unit. As an example, an 8-row, 8-column quantization matrix is set for an 8×8 pixel transform unit, a 2-row, 8-column quantization matrix is set for a 2×8 pixel transform unit, and an 8-row, 2-column quantization matrix is set for an 8×2 pixel transform unit. The quantization matrix setting section 162 may also set for each transform unit a quantization matrix that differs for every combination of prediction mode (intra prediction/inter prediction) and signal component (Y/Cb/Cr), for example. The quantization step of the set quantization matrix may also be adjusted according to a rate control signal from the rate control section 19.

(2) Orthogonal Transform Computing Section

The orthogonal transform computing section 154 uses the orthogonal transform method selected by the transform method selecting section 152 to transform prediction error data input from the subtraction section 14 into transform coefficient data for each transform unit. The orthogonal transform computing section 154 then outputs the transformed transform coefficient data to the quantization section 16. The transform method selecting section 152 also outputs transform method information expressing the orthogonal transform method selected for each transform unit to the quantization section 16.

[1-5. Exemplary Parameter Structure]

FIG. 5 illustrates an example of parameters related to non-square quantization matrices from among the quantization matrix parameters generated by the parameter generating section 134 of the syntax processing section 13. Note that the parameters related to square quantization matrices may be parameters similar to those of an existing image coding scheme such as H.264/AVC.

Referring to FIG. 5, the quantization matrix parameters include a "non-square matrix flag" and parameter groups for generating each non-square quantization matrix.

The "non-square matrix flag" is a flag expressing whether or not to use non-square quantization matrices. In the case where the non-square matrix flag indicates "0: No", non-square quantization matrices are not used, and thus the other parameters illustrated in FIG. 5 for generating non-square quantization matrices are omitted. On the other hand, in the case where the non-square matrix flag indicates "1: Yes", non-square quantization matrices may be used, and these quantization matrices will be generated on the decoding side on the basis of the parameters described below.

The "generation mode" is one parameter for generating a non-square quantization matrix. The "generation mode" is a classification expressing how to generate a non-square quantization matrix. As an example, the generation mode classification may take one of the following values:

0: Full scan mode
1: Copy mode
2: Transpose mode (1) Full Scan Mode

If the DST generation mode is "0: Full scan mode", the quantization matrix parameters additionally include "differential data". The "differential data" is data defining a non-square quantization matrix. The "differential data" may be data obtained by converting all elements of a non-square quantization matrix into a linear array according to a given scan pattern, and encoding that linear array in differential pulse-code modulation (DPCM) format, for example.

(2) Copy Mode

If the generation mode is "1: Copy mode", a non-square quantization matrix is generated by copying some rows or columns of a corresponding square quantization matrix into the respective rows or columns of a non-square quantization matrix. The square quantization matrix corresponding to a particular non-square quantization matrix may be a square quantization matrix having an edge size that is equal to the size of the long edge of that non-square quantization matrix. In this case, the quantization matrix parameters additionally include a "designation mode". The "designation mode" is a classification expressing how to specify the rows or columns of a square quantization matrix that will be used as the copy source rows or columns. As an example, the classification may take one of the following values:

0: Default
1: Copy source ID
2: Direction+copy source ID

If the designation mode is "0: Default", rows or columns at predefined, default positions are treated as the copy source rows or columns. For example, if the size of the non-square quantization matrix being processed is 2 rows by 8 columns (2×8), the size of the corresponding square quantization matrix is 8 rows by 8 columns (8×8). In this case, the 0th and 4th rows, or the 0th and 1st rows, of the 8×8 quantization matrix may be the default copy source. As another example, if the size of the non-square quantization matrix being processed is 8×2, the size of the corresponding square quantization matrix is likewise 8×8. In this case, the 0th and 4th columns, or the 0th and 1st columns, of the 8×8 quantization matrix may be the default copy source. Note that the uppermost row and the leftmost column of a matrix are herein taken to be the 0th row and the 0th column, respectively.

If the designation mode is "1: Copy source ID", the quantization matrix parameters additionally include a "copy source ID". The "copy source ID" expresses one or more row IDs or column IDs for specifying the positions of the rows or columns of a corresponding square quantization matrix that will be used as the copy source rows or columns. For example, assume that the size of the non-square quantization matrix being processed is 2×8, and that the "copy source ID" indicates "0" and "3". In this case, the 0th and 3rd rows of the 8×8 square quantization matrix become the copy source. Note that with this designation scheme, if the long edge of the non-square quantization matrix being processed is a horizontal edge, some rows of a corresponding square quantization matrix become the copy source. Meanwhile, if the long edge of the non-square quantization matrix being processed is a vertical edge, some columns of a corresponding square quantization matrix become the copy source.

If the designation mode is "2: Direction+copy source ID", it is possible to designate rows of a corresponding square quantization matrix as the copy source, and also possible to designate columns as the copy source, irrespective of the direction of the long edge of the non-square quantization matrix being processed. In this case, the quantization matrix parameters additionally include a "copy source ID" and a "copy source direction". The "copy source direction" is a classification for specifying whether to take the rows of a corresponding square quantization matrix as the copy source, or take the columns as the copy source. As an example, the copy source direction classification may take one of the following values:

0: Same direction
1: Different direction

For example, assume that the size of the non-square quantization matrix being processed is 2×8, the "copy source ID" indicates "0" and "3", and the "copy source direction" indicates "0: Same direction". In this case, the 0th and 3rd rows of the 8×8 square quantization matrix become the copy source. On the other hand, in the case where the "copy source direction" indicates "1: Different direction" under similar conditions, the 0th and 3rd columns of the 8×8 square quantization matrix respectively become the copy source for the 0th and 1st rows of the 2×8 non-square quantization matrix.

(3) Transpose Mode

If the generation mode is "2: Transpose mode", the non-square quantization matrix being processed is calculated as the transpose of another non-square quantization matrix whose long edge size and short edge size are inversed. For example, an 8×2 quantization matrix may be calculated as the transpose of a 2×8 quantization matrix.

"Residual data" may be included in the quantization matrix parameters in the case where the generation mode is "1: Copy mode" or "2: Transpose mode". The residual data may be data obtained by converting the residual for all elements of a quantization matrix generated by copying or transposing versus the quantization matrix actually being used into a linear array using a given scan pattern.

As discussed earlier, the quantization matrix parameters exemplified in FIG. 5 may be inserted into the SPS or PPS, or a parameter set different from these parameter sets. Note that these quantization matrix parameters are merely one example. In other words, some of the parameters among the above quantization matrix parameters may also be omitted, while other parameters may also be added. In addition, the parameters other than the "non-square matrix flag" and the "residual data" exemplified in FIG. 5 may be respectively defined for each type of non-square quantization matrix, or commonly defined over multiple types of non-square quantization matrices.

For example, the question of whether to generate non-square quantization matrices in copy mode, and also which rows or columns to copy, may be predefined as a specification shared between the encoder and the decoder. In this case, it is possible to not insert parameters such as the "generation mode", the "designation mode", the "copy source ID", and the "copy source direction" into the parameter set, thereby decreasing overhead and potentially improving coding efficiency.

Additionally, the quantization matrix parameters exemplified in FIG. 5 other than the "non-square matrix flag" may be omitted in the case of using a default quantization matrix as the corresponding square quantization matrix, even when the "non-square matrix flag" indicates "1: Yes". In such cases, a predefined, default quantization matrix may also be used for the non-square quantization matrix.

[1-6. Examples of Generating Non-Square Quantization Matrices]

Figure 6B:
FIG. 6B is a second explanatory diagram for explaining the generation of a non-square quantization matrix in a copy mode.

FIGS. 6A, 6B and 6C illustrate examples of generating non-square quantization matrices in copy mode.

The right side of FIG. 6A illustrates a 2×8 non-square quantization matrix $M_{NS28}$, which is the quantization matrix being generated. Meanwhile, the left side of FIG. 6A illustrates an 8×8 square quantization matrix $M_{S8}$ that corresponds to the quantization matrix $M_{NS28}$. Also, "0: Default" is specified as the designation mode. The predefined, default copy source is assumed to be the 0th and 4th rows. In this case, the quantization matrix $M_{NS28}$ may be generated by copying the 0th row of the quantization matrix $M_{S8}$ into the 0th row, and the 4th row of the quantization matrix $M_{S8}$ into the 1st row. In addition, residual may be added as necessary to each element of the copied quantization matrix $M_{NS28}$.

In this way, by enabling a non-square quantization matrix to be generated by copying rows or columns from a square quantization matrix, it is possible to moderate increases in bit rate caused by using a non-square quantization matrix. In addition, taking the positions of the copy source rows or columns to be default positions avoids increases in bit rate due to specifying the positions of the copy source rows or columns.

The right side of FIG. 6B illustrates an 8×2 non-square quantization matrix $M_{NS82}$, which is the quantization matrix being generated. Meanwhile, the left side of FIG. 6B illustrates an 8×8 square quantization matrix $M_{S8}$ that corresponds to the quantization matrix $M_{NS82}$. Also, "1: Copy source ID" is specified as the designation mode, and (0, 6) is specified as the copy source ID. In this case, the quantization matrix $M_{NS82}$ may be generated by copying the 0th row of the quantization matrix $M_{S8}$ into the 0th row, and the 6th row of the quantization matrix $M_{S8}$ into the 1st row. In addition, residual may be added as necessary to each element of the copied quantization matrix $M_{NS82}$.

In this way, by specifying the positions of copy source rows or columns when generating a non-square quantization matrix from a square quantization matrix, it becomes possible to further reduce the residual of the copied matrix versus the matrix actually being used, and moderate the bit rate for the residual data. Thus, it is possible to more effectively moderate increases in bit rate caused by using a non-square quantization matrix.

The right side of FIG. 6C illustrates a 2×4 non-square quantization matrix $M_{NS24}$, which is the quantization matrix being generated. Meanwhile, the left side of FIG. 6C illustrates a 4×4 square quantization matrix $M_{S4}$ that corresponds to the quantization matrix $M_{NS24}$. Also, "2: Copy source direction+copy source ID" is specified as the designation mode, (0, 3) is specified as the copy source ID, and "1: Different direction" is specified as the copy source direction. In this case, the quantization matrix $M_{NS24}$ may be generated by copying the 0th column of the quantization matrix $M_{S4}$ into the 0th row, and the 3rd column of the quantization matrix $M_{S4}$ into the 1st row. In addition, residual may be added as necessary to each element of the copied quantization matrix $M_{NS24}$.

In this way, by enabling the specification of both the rows and columns of a square quantization matrix as the copy source, irrespective of the shape of the non-square quantization matrix, it is possible to broaden the selection range of a copy source, particularly in the case of using a quantization matrix having asymmetric element values. Thus, it is possible to minimize the residual of the copied matrix versus the matrix actually being used.

Figure 7:
FIG. 7 is an explanatory diagram for explaining the generation of a quantization matrix in a transpose mode.

FIG. 7 illustrates an example of generating a non-square quantization matrix in transpose mode.

The right side of FIG. 7 illustrates a 2×8 non-square quantization matrix $M_{NS28}$, which is the quantization matrix being generated. Meanwhile, the left side of FIG. 7 illustrates an 8×2 non-square quantization matrix $M_{NS82}$. In this case, the quantization matrix $M_{NS28}$ may be generated as the transpose of the quantization matrix $M_{NS82}$ ($M_{NS82}^T$). In addition, residual may be added as necessary to each element of the transposed quantization matrix $M_{NS28}$.

In this way, in transpose mode, it is possible to generate a non-square quantization matrix similar to the case of using copy mode from another, symmetric non-square quantization matrix, without requiring parameters such as the designation mode, copy source ID, and copy source direction. Consequently, it is possible to further reduce the bit rate for a non-square quantization matrix.

Figure 8A:
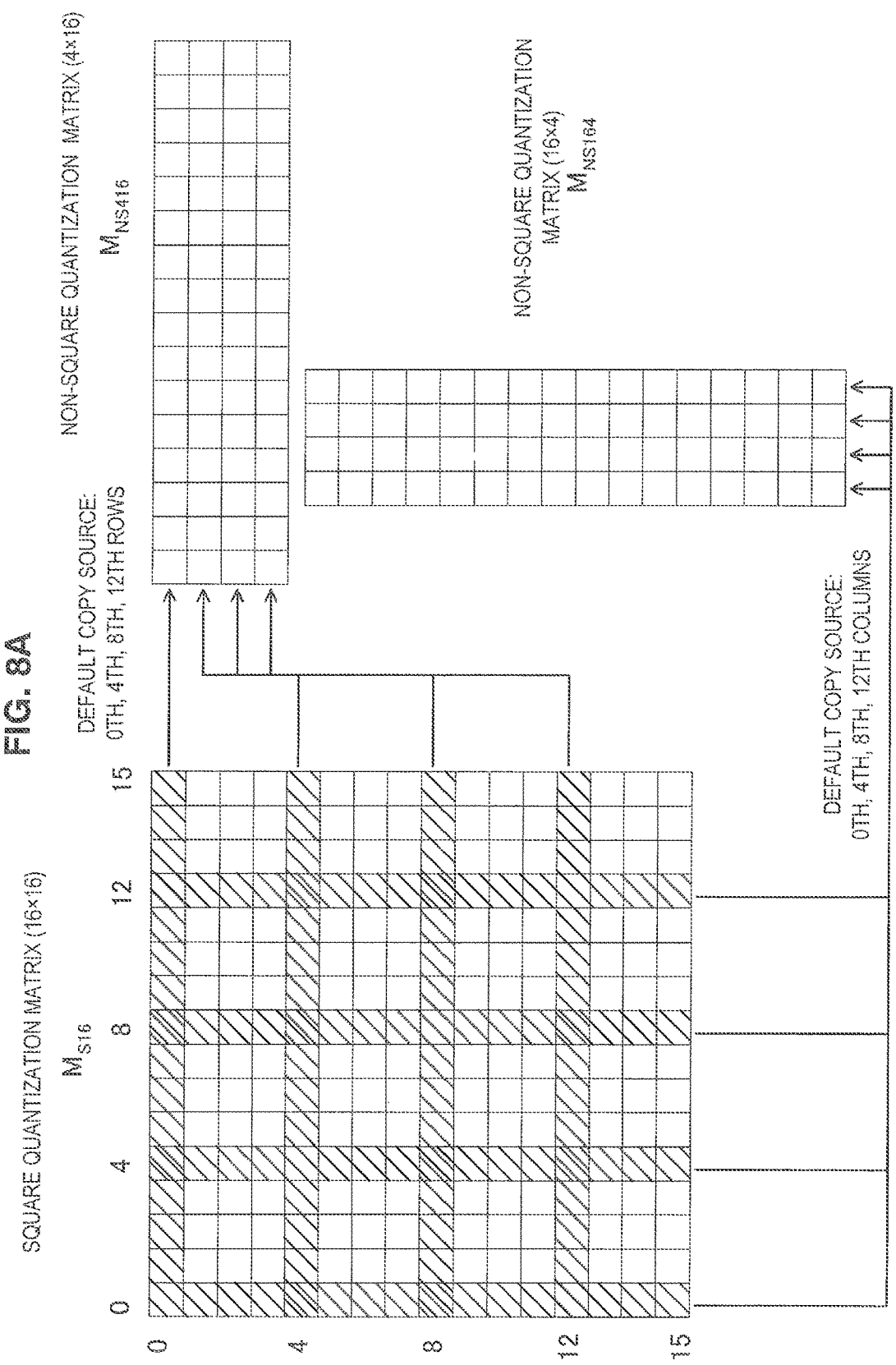
FIG. 8A is a first explanatory diagram for explaining a simplified technique for generating non-square quantization matrices.

FIGS. 8A and 8B are explanatory diagram for explaining a simplified technique for generating non-square quantization matrices.

The right side of FIG. 8A illustrates two non-square quantization matrices $M_{NS416}$ and $M_{NS164}$, which are the quantization matrices being generated. Meanwhile, the left side of FIG. 8A illustrates a corresponding 8×8 square quantization matrix $M_{S16}$. Herein, the question of whether to generate non-square quantization matrices in copy mode, and also which rows/columns to copy, is assumed to be known by both the encoder and the decoder (for example, predefined as a specification). Consequently, the "generation mode", "designation mode", "copy source ID", and "copy source direction" are not encoded as quantization parameters. The positions of the predefined, default copy source rows/columns may be any positions. In the example in FIG. 8A, the positions of the predefined, default copy source rows and columns are assumed to be the positions of every fourth row starting from the 0th row and every fourth column starting from the 0th column, respectively (the shaded portions of the drawing). In this case, the quantization matrix $M_{NS416}$ may be generated by copying the 0th, 4th, 8th, and 12th rows of the quantization matrix $M_{S16}$ into the four rows. The quantization matrix $M_{NS164}$ may be generated by copying the 0th, 4th, 8th, and 12th columns of the quantization matrix $M_{S16}$ into the four columns.

The right side of FIG. 8B illustrates two non-square quantization matrices $M_{NS832}$ and $M_{NS328}$, which are the quantization matrices being generated. Meanwhile, the left side of FIG. 8B illustrates a corresponding 32×32 square quantization matrix $M_{S32}$. Similarly to the example in FIG. 8A, the "generation mode", "designation mode", "copy source ID", and "copy source direction" are not encoded as quantization parameters. Similarly to the example in FIG. 8A, the positions of the predefined, default copy source rows and columns are assumed to be the positions of every fourth row starting from the 0th row and every fourth column starting from the 0th column, respectively (the shaded portions of the drawing). In this case, the quantization matrix $M_{NS832}$ may be generated by copying the 0th, 4th, 8th, 12th, 16th, 20th, 24th, and 28th rows of the quantization matrix $M_{S32}$ into the eight rows. The quantization matrix $M_{NS328}$ may be generated by copying the 0th, 4th, 8th, 12th, 16th, 20th, 24th, and 28th columns of the quantization matrix $M_{S32}$ into the eight columns.

Note that the positions of the default copy source rows/columns may be positions assigned at equal intervals according to a ratio of the edge size of the matrix, as in the examples in FIGS. 8A and 8B. Otherwise, N consecutive rows/columns from the top edge or left edge may be used, for example. Also, instead of copying rows/columns at default positions, four elements at default positions in a square quantization matrix may be copied to into the elements at the four vertex positions of a non-square quantization matrix, with the remaining element being interpolated (using a technique such as linear interpolation, for example). In addition, N elements at default positions in a square quantization matrix (where N is equal to the number of all elements in a non-square quantization matrix) may be respectively copied into the elements at corresponding positions in the non-square quantization matrix.

In this way, by predefining whether to generate a non-square quantization matrix from a square quantization matrix in copy mode, and also how to copy the matrices, it is possible to omit much of the encoding of quantization matrix parameters for a non-square quantization matrix. Thus, it is possible to reduce transmission overhead, while also reducing the complexity of the encoder and decoder configurations.

FIG. 9 is an explanatory diagram for explaining a technique for generating non-square quantization matrices in the case of using a default square quantization matrix.

The left side of FIG. 9 illustrates an 8×8 default square quantization matrix MS8*def*. In the case of using such a default square quantization matrix $M_{S8def}$, the corresponding non-square quantization matrices may also be default matrices. The right side of FIG. 9 illustrates two default non-square quantization matrices $M_{NS28def}$ and $M_{NS82def}$. Instead of being generated from the square quantization matrix $M_{S8def}$ (using a technique such as copying rows or columns), the non-square quantization matrices $M_{NS28def}$ and $M_{NS82def}$ may be predefined as a shared specification, and stored in memory in both the encoder and the decoder, for example.

In this way, in the case of using a default square quantization matrix, taking the non-square quantization matrices to also be default quantization matrices makes it possible to decrease the quantization matrix parameters to encode, and reduce transmission overhead. Additionally, it is possible to reduce the complexity of the encoder and decoder configurations.

[1-7. Examples of Scan Patterns]

With the quantization matrix parameters exemplified in FIG. 5, differential data in full scan mode, as well as residual data in copy mode and transpose mode, are generated by linearizing a two-dimensional matrix according to some scan pattern. The scan patterns generally used when linearizing the elements of a square quantization matrix are what are called zigzag scans. In contrast, when linearizing the elements of a non-square quantization matrix, scan patterns that differ from scan patterns resembling zigzag scans may also be used.

Figure 10:
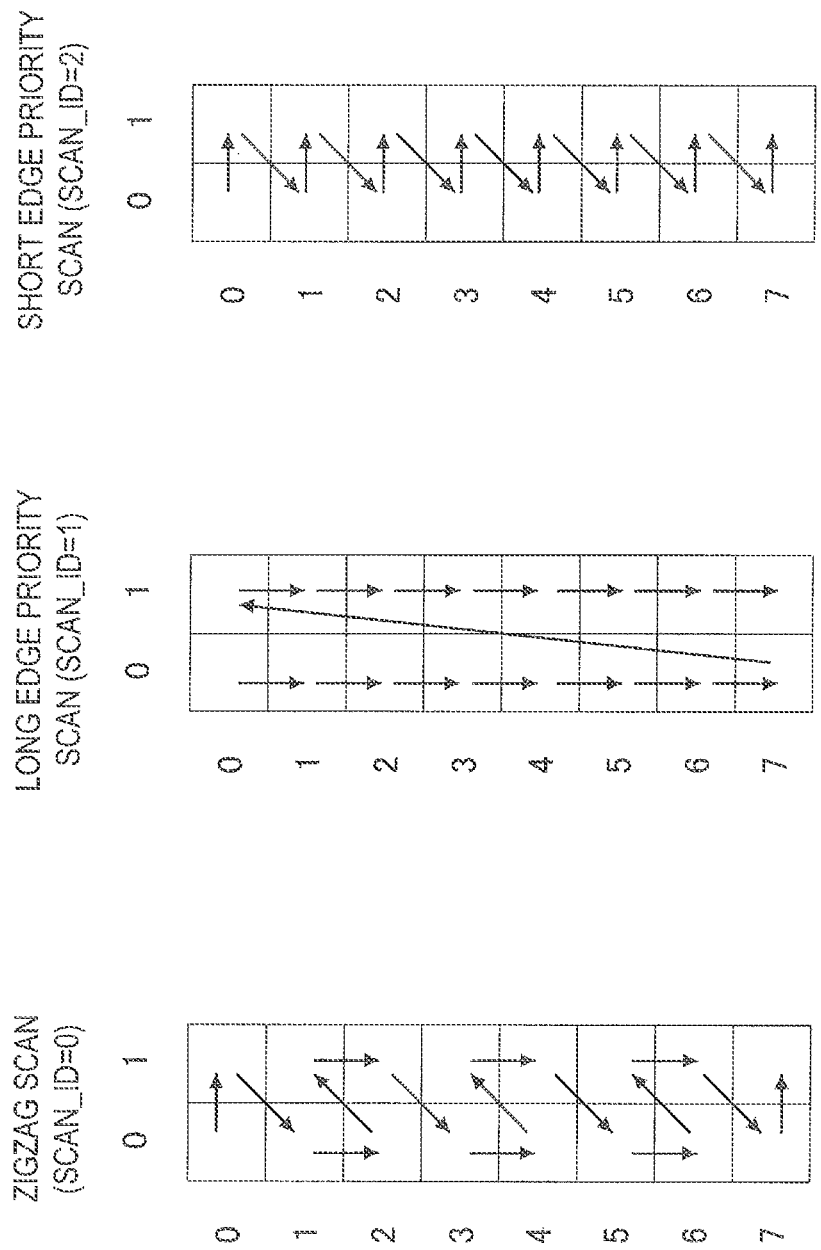
FIG. 10 is an explanatory diagram for explaining examples of scan patterns for a non-square quantization matrix.

FIG. 10 illustrates three examples of scan patterns which may be used for a non-square quantization matrix.

The first example on the left side of FIG. 10 is a scan pattern that resembles a zigzag scan. Herein, this scan pattern is also called a zigzag scan. In a zigzag scan, a high correlation is assumed between elements positioned on the diagonals from the upper-right to the lower-left in the quantization matrix, and a scan sequence is determined such that elements in highly correlated element groups are consecutively scanned.

The second example in the center of FIG. 10 is a scan pattern that consecutively scans element groups arranged in the direction of the long edge of a non-square quantization matrix. This scan pattern is called a long edge priority scan. A long edge priority scan decreases differences between consecutively scanned elements and optimizes the post-DPCM linear array in the case of high correlation between elements arranged in the direction of the long edge in a quantization matrix.

The third example on the right side of FIG. 10 is a scan pattern that consecutively scans element groups arranged in the direction of the short edge of a non-square quantization matrix. This scan pattern is called a short edge priority scan. A short edge priority scan decreases differences between consecutively scanned elements and optimizes the post-DPCM linear array in the case of high correlation between elements arranged in the direction of the short edge in a quantization matrix.

The scan pattern used for a non-square quantization matrix may be any statically defined scan pattern from among the scan patterns exemplified in FIG. 10. Otherwise, the scan pattern that optimizes the coding efficiency may be adaptively selected from among multiple scan pattern candidates for each sequence, each picture, or each slice. In this case, an identifier for identifying the scan pattern to use (such as the scan ID (scan_id) exemplified in FIG. 10) may be included in a parameter set such as the SPS, PPS, or slice header.

2. Process Flow During Encoding According to Embodiment

Figure 11:
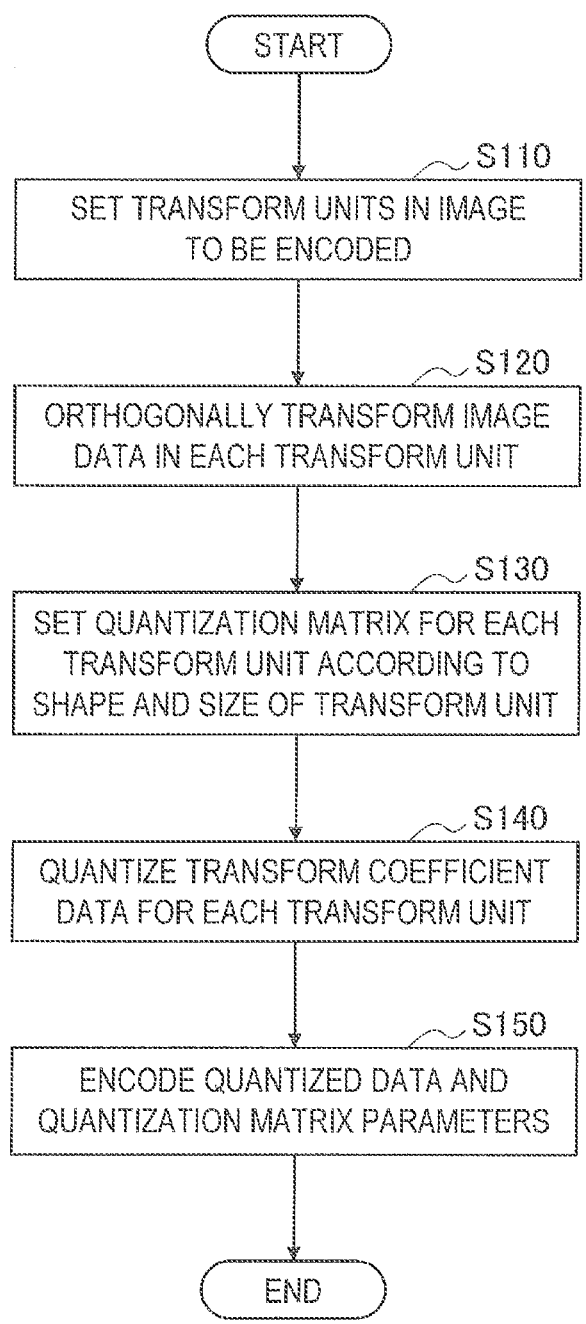
FIG. 11 is a flowchart illustrating an example of the flow of a process during encoding according to an embodiment.

FIG. 11 is a flowchart illustrating an example of the flow of a process during encoding by an image encoding device 10 according to the present embodiment. Note that for the sake of the clarity of the description herein, only the processing steps relating to the orthogonal transform and quantization of image data are illustrated.

Referring to FIG. 11, first, the transform unit setting section 152 of the orthogonal transform section 15 recognizes the shape and size of each transform unit to set in image data to encode, and sets transform units within the image (step S110).

Next, the orthogonal transform computing section 154 generates transform coefficient data by orthogonally transforming image data (prediction error data input from the subtraction section 14) for each transform unit set by the transform unit setting section 152 (step S120).

Next, the quantization matrix setting section 162 of the quantization section 16 sets a quantization matrix for each transform unit according to the shape and size of the set transform unit (step S130).

Next, the quantization computing section 164 uses the quantization matrix set by the quantization matrix setting section 162 to quantize the transform coefficient data input from the orthogonal transform computing section 154 for each transform unit (step S140).

The lossless encoding section 17 then generates an encoded stream by encoding quantized data input from the quantization computing section 164, and also encodes and multiplexes quantization matrix parameters into the encoded stream (step S150).

Typically, these processing steps may be repeated for all transform units within the image to encode.

3. Exemplary Configuration of Image Decoding Device According to Embodiment

This section describes an exemplary configuration of an image decoding device according to an embodiment.

[3-1. Exemplary Overall Configuration]

Figure 12:
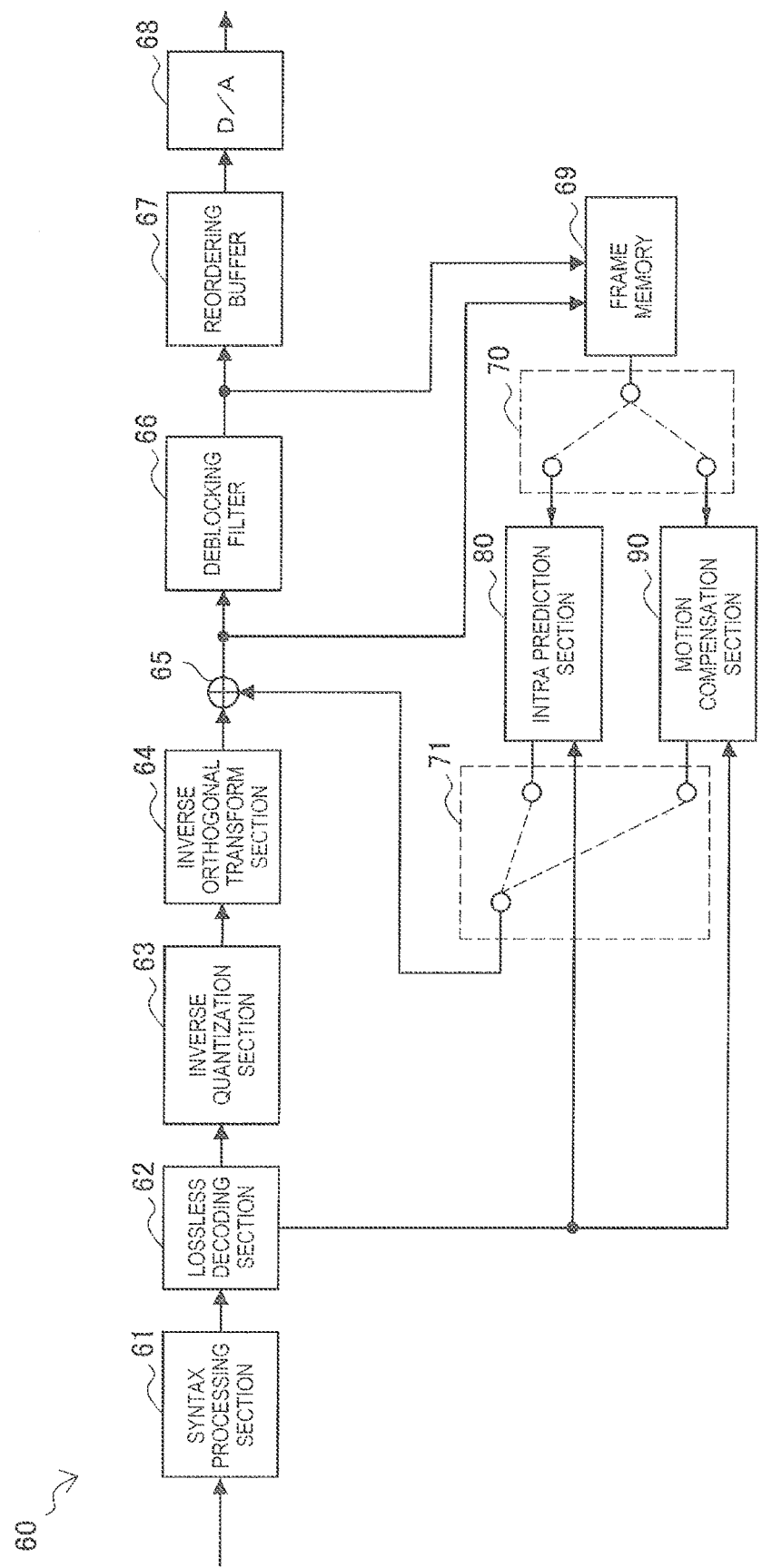
FIG. 12 is a block diagram illustrating an exemplary configuration of an image decoding device according to an embodiment.

FIG. 12 is a block diagram illustrating an exemplary configuration of an image decoding device 60 according to an embodiment. Referring to FIG. 12, the image decoding device 60 is equipped with a syntax processing section 61, a lossless decoding section 62, an inverse quantization section 63, an inverse orthogonal transform section 64, an addition section 65, a deblocking filter 66, a reordering buffer 67, a digital-to-analog (D/A) conversion section 68, frame memory 69, selectors 70 and 71, an intra prediction section 80, and a motion compensation section 90.

The syntax processing section 61 acquires header information such as SPSs, PPSs, and slice headers from an encoded stream input via a transmission channel, and recognizes various settings for a decoding process by the image decoding device 60 on the basis of the acquired header information. For example, in the present embodiment, the syntax processing section 61 generates candidates for a quantization matrix to be possibly used during an inverse quantization process by the inverse quantization section 63 on the basis of quantization matrix parameters included in each parameter set. A detailed configuration of the syntax processing section 61 will be further described later.

The lossless decoding section 62 decodes the encoded stream input from the syntax processing section 63 according to the coding method used at the time of encoding. The lossless decoding section 62 then outputs the decoded quantization data to the inverse quantization section 62. In addition, the lossless decoding section 62 outputs information about intra prediction included in the header information to the intra prediction section 80, and outputs information about inter prediction to the motion compensation section 90.

The inverse quantization section 63 uses a quantization matrix corresponding to the shape and size of each transform unit from among the quantization matrix candidates generated by the syntax processing section 61 to inversely quantize the quantization data decoded by the lossless decoding section 62 (that is, quantized transform coefficient data). A detailed configuration of the inverse quantization section 63 will be further described later.

The inverse orthogonal transform section 64 generates prediction error data by inverse orthogonally transforming inversely quantized transform coefficient data for each transform unit set within an image to decode. The shape of a transform unit which may be set in the present embodiment is square or non-square, as discussed earlier. The inverse orthogonal transform section 64 then outputs the generated prediction error data to the addition section 65.

The addition section 65 adds the prediction error data input from the inverse orthogonal transform section 64 to predicted image data input from the selector 71 to thereby generate decoded image data. Then, the addition section 65 outputs the decoded image data thus generated to the deblocking filter 66 and the frame memory 69.

The deblocking filter 66 removes blocking artifacts by filtering the decoded image data input from the addition section 65, and outputs the decoded image data thus filtered to the reordering buffer 67 and the frame memory 69.

The reordering buffer 67 generates a chronological sequence of image data by reordering images input from the deblocking filter 66. Then, the reordering buffer 67 outputs the generated image data to the D/A conversion section 68.

The D/A conversion section 68 converts the image data in a digital format input from the reordering buffer 67 into an image signal in an analog format. Then, the D/A conversion section 68 causes an image to be displayed by outputting the analog image signal to a display (not illustrated) connected to the image decoding device 60, for example.

The frame memory 69 uses a storage medium to store the unfiltered decoded image data input from the addition section 65 and the filtered decoded image data input from the deblocking filter 66.

The selector 70 switches the output destination of the image data from the frame memory 69 between the intra prediction section 80 and the motion compensation section 90 for each block in the image according to mode information acquired by the lossless decoding section 62. For example, in the case where an intra prediction mode is specified, the selector 70 outputs the unfiltered decoded image data that is supplied from the frame memory 69 to the intra prediction section 80 as reference image data. Also, in the case where an inter prediction mode is specified, the selector 70 outputs the filtered decoded image data that is supplied from the frame memory 69 to the motion compensation section 90 as reference image data.

The selector 71 switches the output source of predicted image data to be supplied to the addition section 65 between the intra prediction section 80 and the motion compensation section 90 for each block in the image according to the mode information acquired by the lossless decoding section 62. For example, in the case where an intra prediction mode is specified, the selector 71 supplies the addition section 65 with the predicted image data output from the intra prediction section 80. In the case where an inter prediction mode is specified, the selector 71 supplies the addition section 65 with the predicted image data output from the motion compensation section 90.

The intra prediction section 80 performs in-picture prediction of pixel values on the basis of the information about intra prediction input from the lossless decoding section 62 and the reference image data from the frame memory 69, and generates predicted image data. Then, the intra prediction section 80 outputs the predicted image data thus generated to the selector 71.

The motion compensation section 90 performs a motion compensation process on the basis of the information about inter prediction input from the lossless decoding section 62 and the reference image data from the frame memory 69, and generates predicted image data. Then, the motion compensation section 90 outputs the predicted image data thus generated to the selector 71.

[3-2. Exemplary Configuration of Syntax Processing Section]

Figure 13:
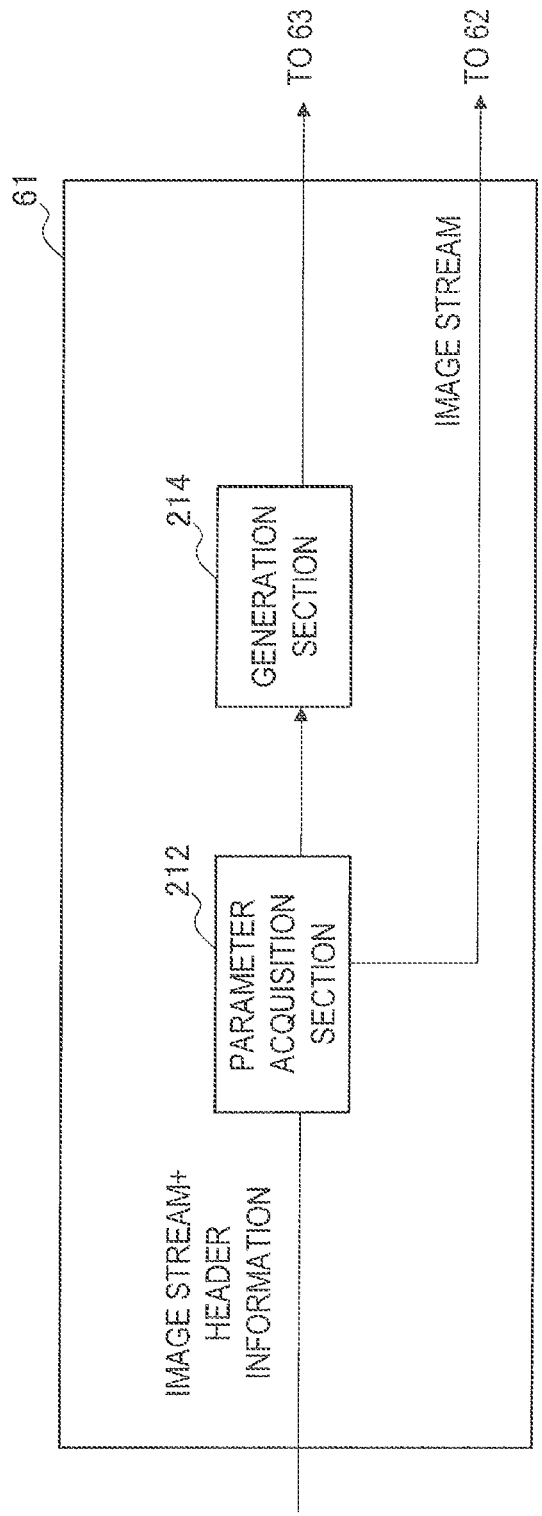
FIG. 13 is a block diagram illustrating an example of a detailed configuration of the syntax processing section illustrated in FIG. 12.

FIG. 13 is a block diagram illustrating an example of a detailed configuration of the syntax processing section 61 of the image decoding device 60 illustrated in FIG. 12. Referring to FIG. 13, the syntax processing section 61 includes a parameter acquisition section 212 and a generation section 214.

(1) Parameter Acquisition Section

The parameter acquisition section 212 recognizes header information such as SPSs, PPSs, and slice headers from the stream of image data, and acquires parameters included in the header information. For example, in the present embodiment, the parameter acquisition section 212 acquires quantization matrix parameters defining a quantization matrix from each parameter set. The parameter acquisition section 212 then outputs the acquired parameters to the generation section 214. The parameter acquisition section 212 also outputs the stream of image data to the lossless decoding section 62.

(2) Generation Section

The generation section 214 generates quantization matrix candidates which may be used by the inverse quantization section 63, on the basis of the quantization matrix parameters acquired by the parameter acquisition section 212. In the present embodiment, the quantization matrices generated by the generation section 214 include quantization matrices that correspond to each type (that is, each combination of shape and size) of transform unit, which is the unit of inverse orthogonal transform by the inverse orthogonal transform section 64.

More specifically, in the case where the default quantization matrix is not used, for example, the generation section 214 generates square quantization matrices of various sizes on the basis of a definition in the parameter set or the header of the encoded stream. The generation section 214 also generates non-square quantization matrices in the case where the parameter set or the header of the encoded stream includes a flag indicating that a non-square quantization matrix is to be used (for example, the non-square matrix flag discussed earlier). Non-square quantization matrices may be generated according to any of the full scan mode, copy mode, and transpose mode discussed earlier.

For example, in copy mode, the generation section 214 generates a non-square quantization matrix by copying rows or columns from a corresponding square quantization matrix. The question of which rows or columns to copy from the square quantization matrix may be specified by a copy source ID and copy source direction in the quantization matrix parameters. Meanwhile, in the case where the rows or columns to copy are not specified, rows or columns at predefined, default positions may be treated as the copy source.

Additionally, in full scan mode, the generation section 214 generates a non-square quantization matrix on the basis of a definition using differential data in DPCM format, instead of generating a non-square quantization matrix from a square quantization matrix.

Additionally, in transpose mode, the generation section 214 generates a non-square quantization matrix as the transpose of another non-square quantization matrix having a symmetric shape to the non-square quantization matrix. In the cases of copy mode and transpose mode, the generation section 214 may furthermore add residual defined in the quantization matrix parameters to each element of the copied quantization matrix or the transposed quantization matrix.

Note that in the case where the square quantization matrix corresponding to a particular non-square quantization matrix is a default quantization matrix, the generation section 214 uses a predefined, default non-square quantization matrix as the non-square quantization matrix.

The generation section 214 outputs quantization matrix candidates generated in this way to the inverse quantization section 63.

[3-3. Exemplary Configuration of Inverse Quantization Section]

Figure 14:
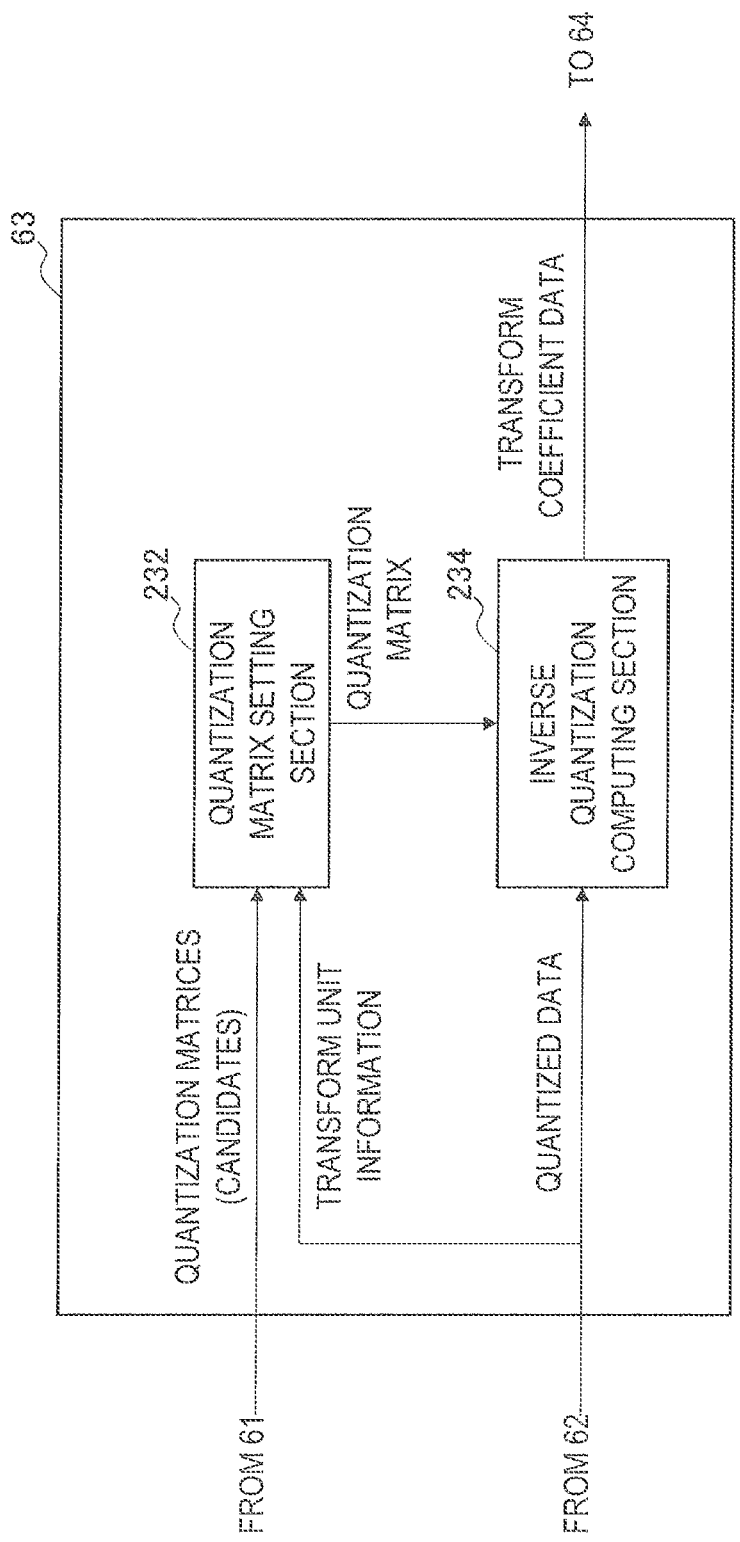
FIG. 14 is a block diagram illustrating an example of a detailed configuration of the inverse quantization section illustrated in FIG. 12.

FIG. 14 is a block diagram illustrating an example of a detailed configuration of the inverse quantization section 63 of the image decoding device 60 illustrated in FIG. 12. Referring to FIG. 14, the inverse quantization section 63 includes a quantization matrix setting section 232 and an inverse quantization computing section 234.

(1) Quantization Matrix Setting Section

The quantization matrix setting section 232 recognizes the shapes and sizes of the transform units used during inverse orthogonal transform by the inverse orthogonal transform section 64, and sets a quantization matrix corresponding to the recognized shape and size for each transform unit. For example, the quantization matrix setting section 232 acquires transform unit information included in the header information of an encoded stream. Then, the quantization matrix setting section 232 recognizes the shape and size of each transform unit from the transform unit information, and sets, for each transform unit, a quantization matrix corresponding to the recognized shape and size from among the quantization matrices generated by the generation section 214 of the syntax processing section 61. Note that the quantization matrix setting section 232 may also set for each transform unit a quantization matrix that differs for every combination of prediction mode (intra prediction/inter prediction) and signal component (Y/Cb/Cr), for example.

(2) Inverse Quantization Somputing Section

The inverse quantization computing section 234 uses the quantization matrix set by the quantization matrix setting section 232 to inversely quantize the transform coefficient data (quantized data) input from the orthogonal transform section 62 for each transform unit. The inverse quantization computing section 234 then outputs inversely quantized transform coefficient data to the inverse orthogonal transform section 64.

[3-4. Exemplary Configuration of Inverse Orthogonal Transform Section]

Figure 15:
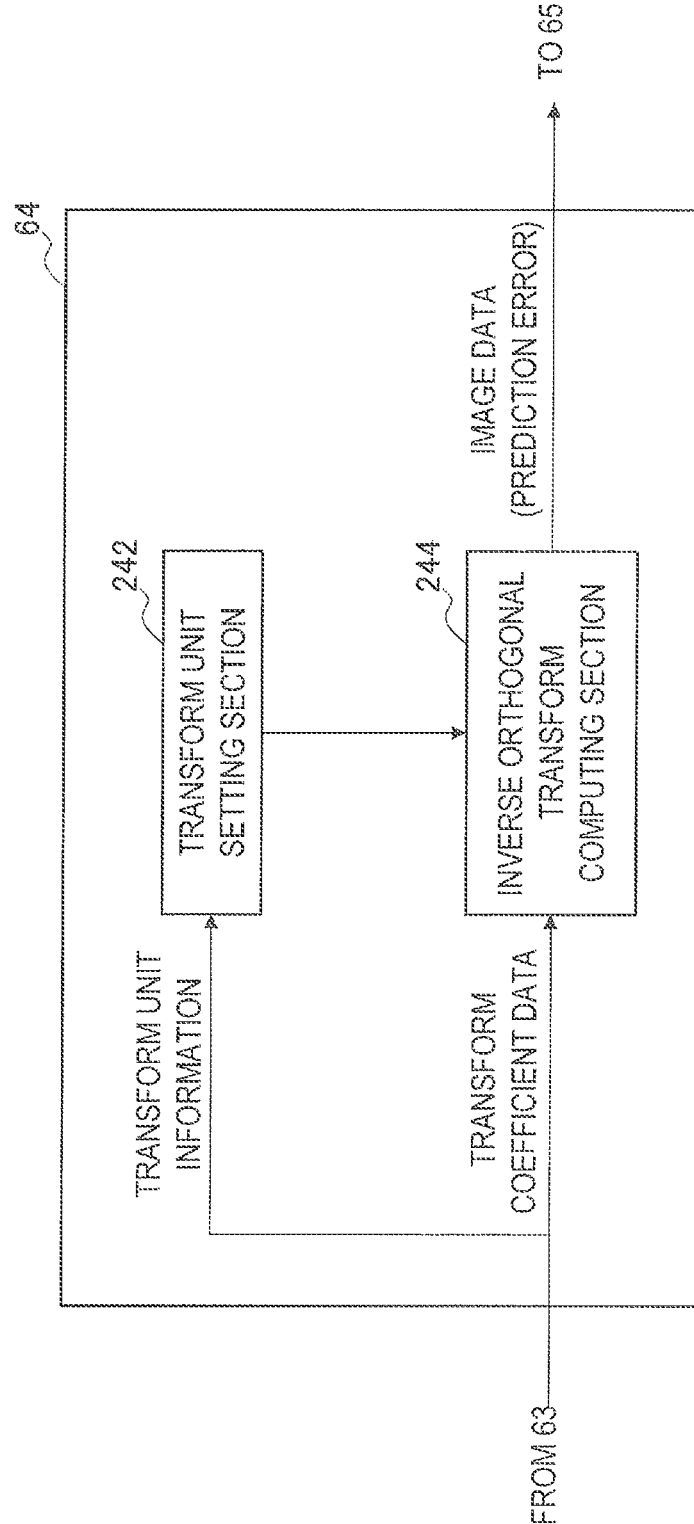
FIG. 15 is a block diagram illustrating an example of a detailed configuration of the inverse orthogonal transform section illustrated in FIG. 12.

FIG. 15 is a block diagram illustrating an example of a detailed configuration of the inverse orthogonal transform section 64 of the image decoding device 60 illustrated in FIG. 12. Referring to FIG. 15, the inverse orthogonal transform section 64 includes a transform unit setting section 242 and an inverse orthogonal transform computing section 244.

(1) Transform Unit Setting Section

The transform unit setting section 242 sets square or non-square transform units as the transform units used when inverse orthogonally transforming image data to decode. The shape of a transform unit set by the transform unit setting section 242 may be square or non-square. For example, in the case where the intra prediction section 80 uses the short distance intra prediction method discussed earlier, the transform unit setting section 242 may set a non-square transform unit of the same size as a prediction unit in an image when a non-square prediction unit is selected as the prediction unit.

(2) Orthogonal Transform Computing Section

The inverse orthogonal transform computing section 244 generates prediction error data by inverse orthogonally transforming transform coefficient data input from the inverse quantization section 63 for each transform unit set by the transform unit setting section 242. The inverse orthogonal transform computing section 244 then outputs the generated prediction error data to the addition section 65.

Figure 16:
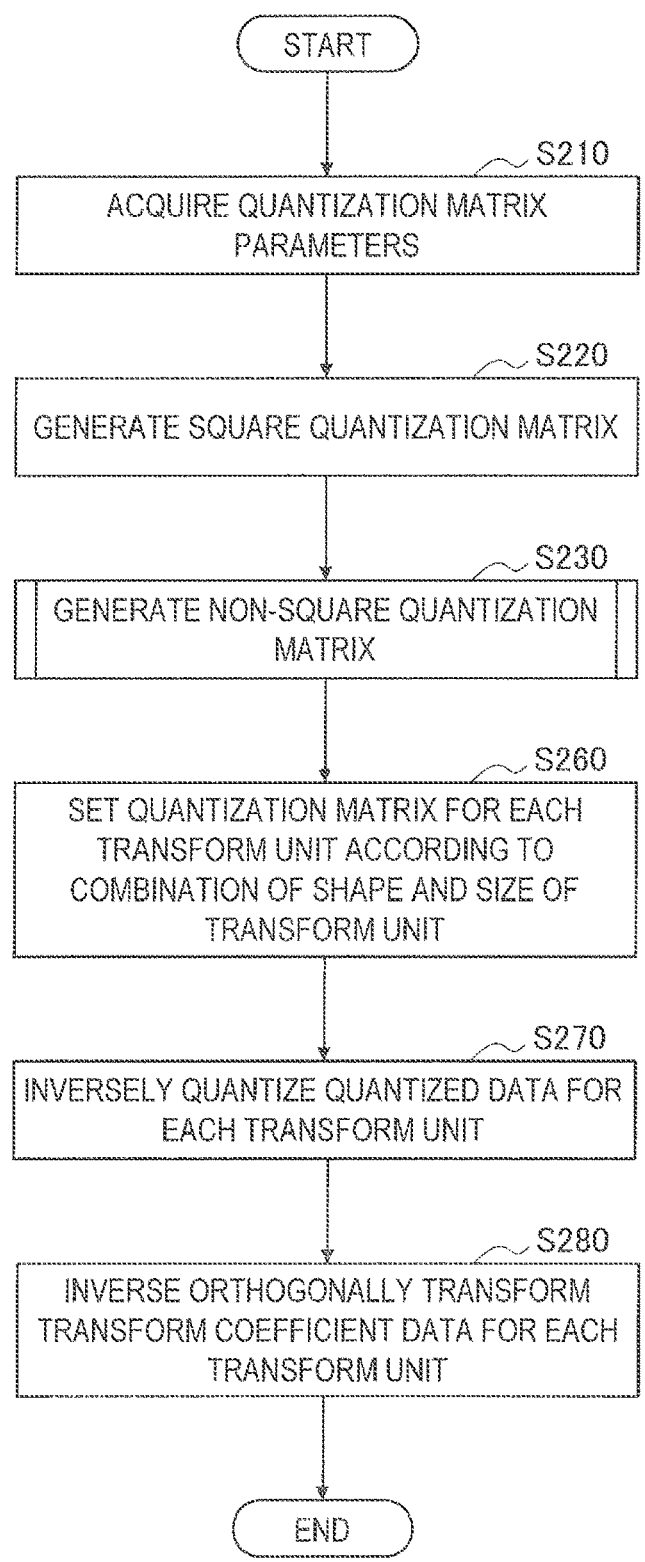
FIG. 16 is a flowchart illustrating an example of the flow of a process during decoding according to an embodiment.

4. Process Flow During Decoding According to Embodiment (1) Overview of Process Flow FIG. 16 is a flowchart illustrating an example of the flow of a process during decoding by an image decoding device 60 according to the present embodiment. Note that for the sake of the clarity of the description herein, only the processing steps relating to the inverse quantization and inverse orthogonal transform of image data are illustrated.

Referring to FIG. 16, first, the parameter acquisition section 212 of the syntax processing section 61 recognizes header information such as SPSs, PPSs, and slice headers from the stream of image data, and acquires quantization matrix parameters included in the header information (step S210).

Next, the generation section 214 of the syntax processing section 61 generates a square quantization matrix from among quantization matrix candidates which may be used by the inverse quantization section 63, on the basis of the quantization matrix parameters acquired by the parameter acquisition section 212 (step S220).

Next, the generation section 214 generates a non-square quantization matrix from among quantization matrix candidates which may be used by the inverse quantization section 63, on the basis of the above quantization matrix parameters (step S230). A detailed flow of the process at this point will be further described later using FIG. 17.

Next, the quantization matrix setting section 232 of the inverse quantization section 63 sets, for each transform unit, a quantization matrix corresponding to the combination of the shape and size of that transform unit (step S260).

Next, the inverse quantization computing section 234 of the inverse quantization section 63 uses the quantization matrix set by the quantization matrix setting section 232 to inversely quantize the quantized data input from the lossless decoding section 62 for each transform unit (step S270).

Next, the inverse quantization computing section 234 of the inverse quantization section 63 uses the quantization matrix set by the quantization matrix setting section 232 to inversely quantize the quantized data input from the lossless decoding section 62 for each transform unit (step S270).

Next, the inverse orthogonal transform section 64 generates prediction error data by inverse orthogonally transforming transform coefficient data input from the inverse quantization section 63 for each transform unit (step S280). By having the addition section 65 add the prediction error data generated at this point to the predictive image data, the image data from before encoding is restored.

Note that the processing from step S260 to step S280 typically may be repeated for all transform units within the image to decode.

(2) Non-Square Quantization Matrix Generation Process

Figure 17:
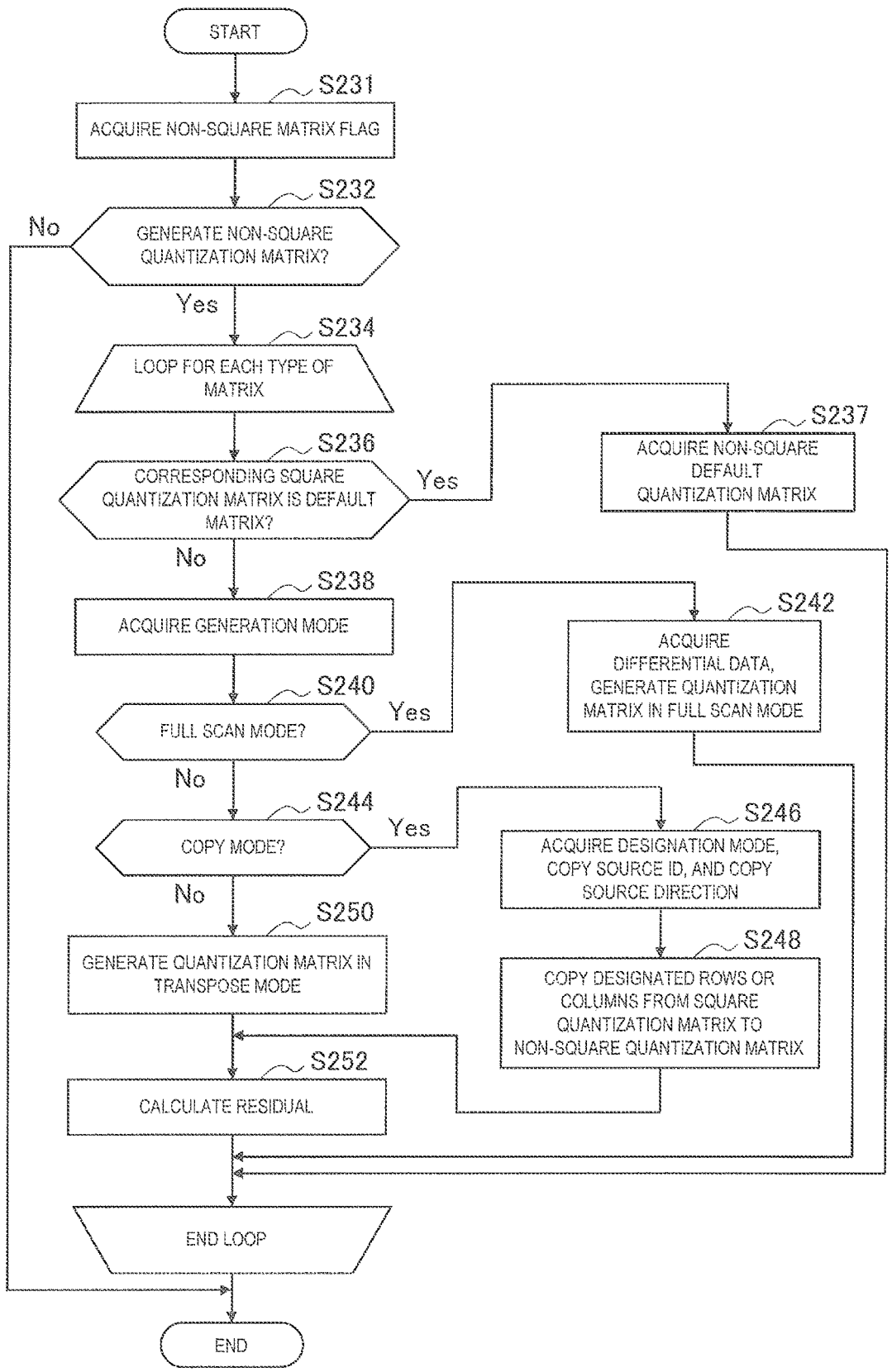
FIG. 17 is a flowchart illustrating an example of the flow of the quantization matrix generation process illustrated in FIG. 16.

FIG. 17 is a flowchart illustrating an example of the flow of a non-square quantization matrix generation process in step S230 of FIG. 16. The process illustrated in FIG. 17 may be conducted for each parameter set that includes quantization matrix parameters. Note that each parameter set is assumed to include quantization matrix parameters like those exemplified in FIG. 5.

Referring to FIG. 17, first, the generation section 214 acquires the non-square matrix flag (step S231). The generation section 214 then determines whether or not to generate a non-square quantization matrix, on the basis of the value of the non-square matrix flag (step S232). At this point, the generation section 214 skips subsequent processing in the case of determining to not generate a non-square quantization matrix. On the other hand, the process proceeds to step S234 in the case where the generation section 214 determines to generate a non-square quantization matrix.

The processing from step S236 to step S252 may be repeated for every type of non-square quantization matrix (step S234). Types of non-square quantization matrices may be classified by combinations of quantization matrix size, prediction mode, and signal components, for example.

In step S238, the generation section 214 determines whether or not the corresponding square quantization matrix is a default quantization matrix (step S236). At this point, the process proceeds to step S237 in the case where the corresponding square quantization matrix is a default quantization matrix. On the other hand, the process proceeds to step S238 in the case where the corresponding square quantization matrix is not a default quantization matrix.

In step S237, the generation section 214 acquires a predefined, default quantization matrix being stored in memory as the non-square quantization matrix to be generated (step S237).

In step S238, the generation section 214 acquires the generation mode (step S238). The generation section 214 then switches the subsequent processing on the basis of the value of the acquired generation mode.

For example, in the case where the generation mode indicates full scan mode (step S240), the generation section 214 additionally acquires differential data, and generates a non-square quantization matrix in full scan mode (step S242).

Additionally, in the case where the generation mode indicates copy mode (step S244), the generation section 214 additionally acquires the designation mode, and if necessary, the copy source ID and the copy source direction (step S246). The generation section 214 then generates a non-square quantization matrix in copy mode, or in other words, by copying designated rows or columns from a corresponding square quantization matrix (step S248).

Additionally, in the case where the generation mode indicates transpose mode, for example, the generation section 214 generates a non-square quantization matrix in transpose mode from another non-square quantization matrix having a symmetric shape to the non-square quantization matrix (step S250).

Note that in the case of predefined generation of a non-square quantization matrix by copying from a square quantization matrix, a non-square quantization matrix may be generated in copy mode as a general rule, without switching processing on the basis of the value of the generation mode.

Furthermore, in the case where residual data exists in copy mode or transpose mode, the generation section 214 adds residual to each element of the copied quantization matrix or the transposed quantization matrix (step S252).

5. Application to Various Codecs

Technology according to the present disclosure is applicable to various codecs related to image encoding and decoding. In this section, examples will be described in which technology according to the present disclosure is respectively applied to a multiview codec and a scalable codec.

[5-1. Multiview Codec]

Figure 18:
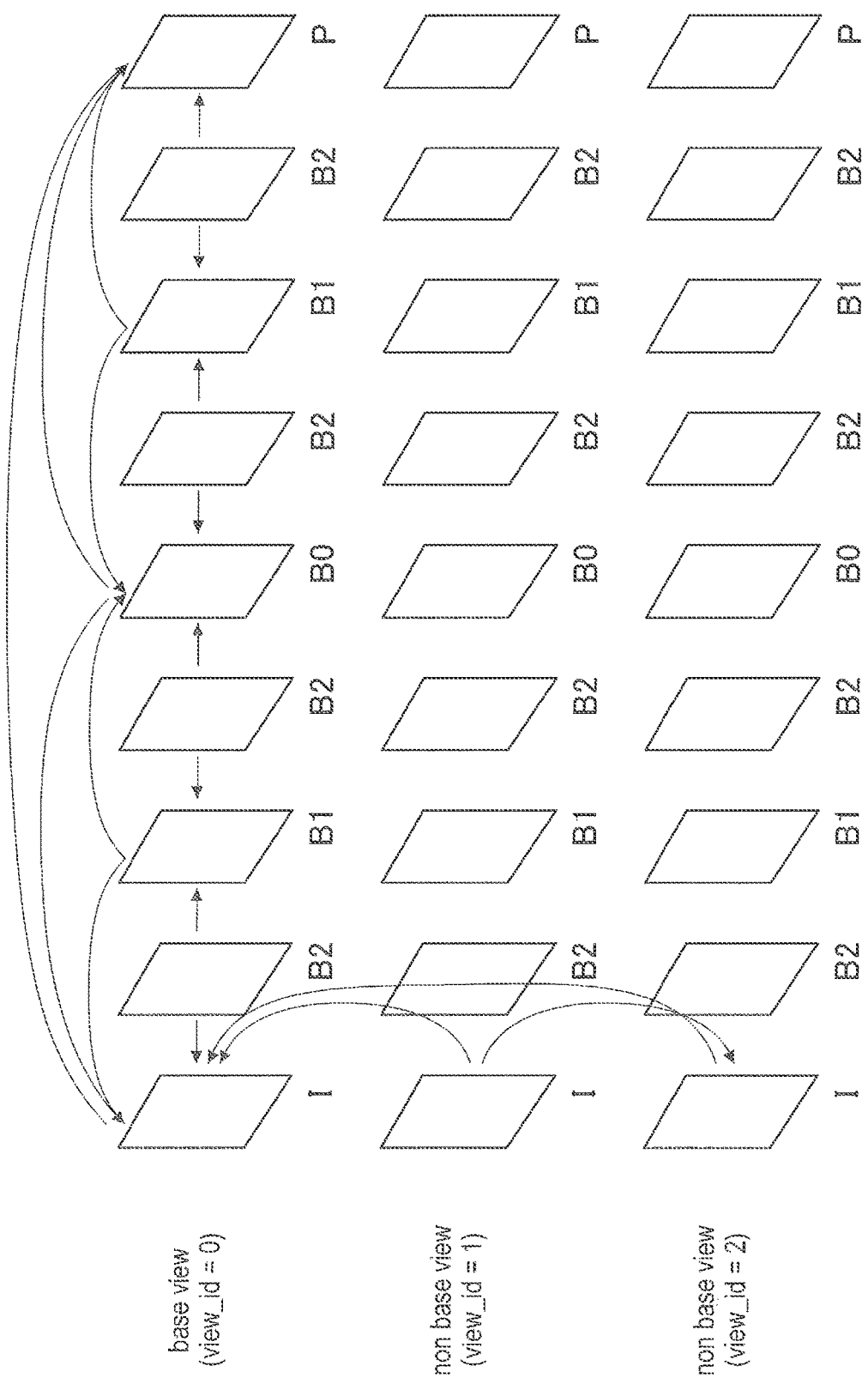
FIG. 18 is an explanatory diagram for explaining a multiview codec.

A multiview codec is an image coding scheme for encoding and decoding what is called multiview video. FIG. 18 is an explanatory diagram for explaining a multiview codec. Referring to FIG. 18, frame sequences for three views respectively captured from three viewpoints are illustrated. Each view is given a view ID (view_id). One of these multiple views is designated the base view. The views other than the base view are called non-base views. In the example in FIG. 18, the view with the view ID "0" is the base view, while the two views with the view IDs "1" and "2" are non-base views. When encoding this multiview image data, the overall data size of the encoded stream may be compressed by encoding frames in the non-base views on the basis of encoding information for frames in the base view.

In an encoding process and decoding process according to the above multiview codec, quantization matrices corresponding to non-square transform units may be generated from quantization matrices corresponding to square transform units. Control parameters of some kind (the parameters exemplified in FIG. 5, for example) may also be set for each view in order to generate the quantization matrices to be used with each view. Also, control parameters set in the base view may be reused for non-base views. Also, a flag indicating whether or not to reuse control parameters across views may be additionally specified.

Figure 19:
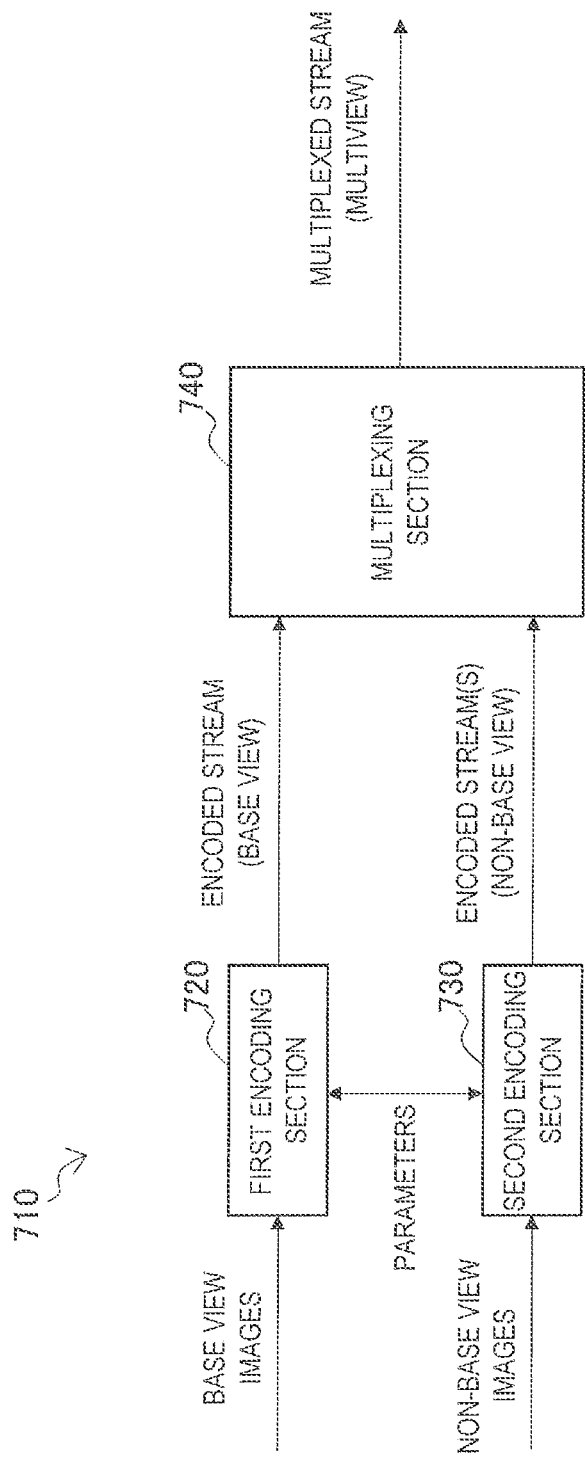
FIG. 19 is an explanatory diagram for explaining an application of an image encoding process according to an embodiment to a multiview codec.

FIG. 19 is an explanatory diagram for explaining an application of the earlier image encoding process to a multiview codec. Referring to FIG. 19, a configuration of a multiview encoding device 710 is illustrated as an example. The multiview encoding device 710 is equipped with a first encoding section 720, a second encoding section 730, and a multiplexing section 740.

The first encoding section 720 encodes base view images, and generates an encoded stream of the base view. The second encoding section 730 encodes non-base view images, and generates encoded streams of the non-base views. The multiplexing section 740 multiplexes the encoded stream of the base view generated by the first encoding section 720 with one or more encoded streams of non-base views generated by the second encoding section 730, and generates a multiview multiplexed stream.

The first encoding section 720 and the second encoding section 730 exemplified in FIG. 19 have a similar configuration to the image encoding device 10 according to an embodiment discussed earlier. Thus, it becomes possible to generate quantization matrices corresponding to non-square transform units to be used for each view from quantization matrices corresponding to square transform units. Parameters that control these processes may be inserted into the header area of the encoded stream for each view, or inserted into a shared header area in the multiplexed stream.

Figure 20:
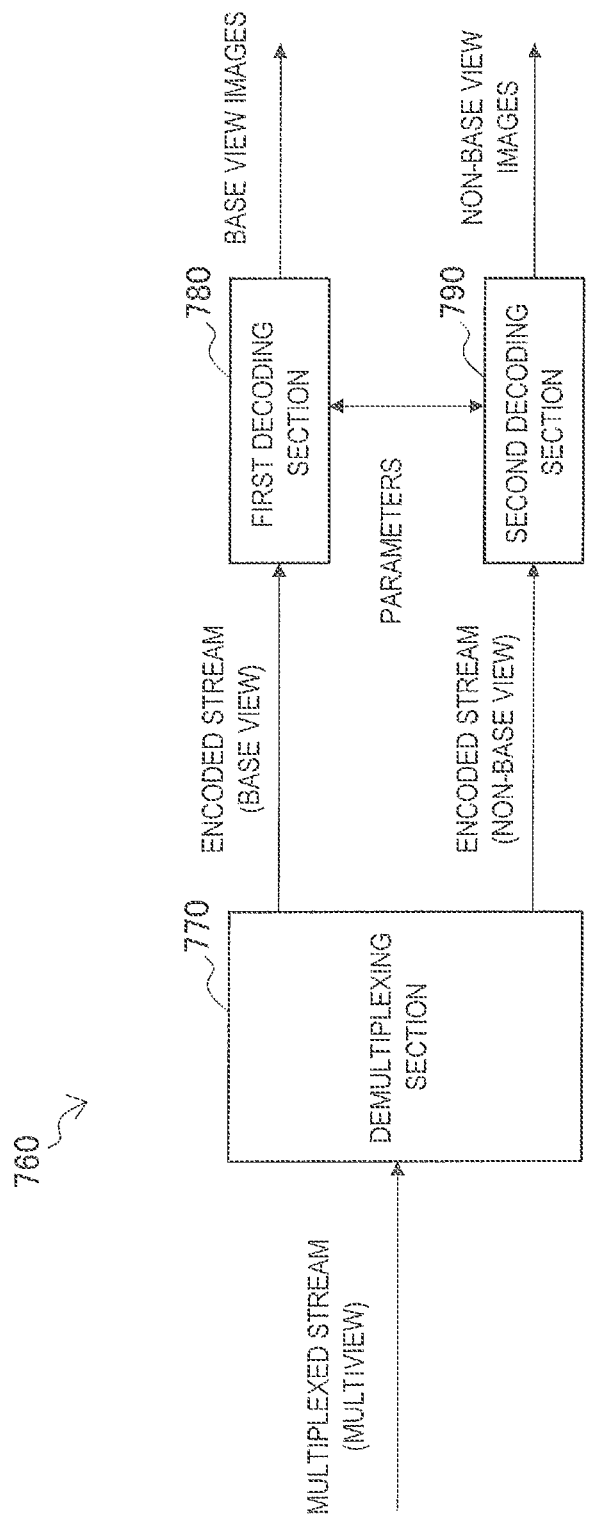
FIG. 20 is an explanatory diagram for explaining an application of an image decoding process according to an embodiment to a multiview codec.

FIG. 20 is an explanatory diagram for explaining an application of the earlier image decoding process to a multiview codec. Referring to FIG. 20, a configuration of a multiview decoding device 760 is illustrated as an example. The multiview decoding device 760 is equipped with a demultiplexing section 770, a first decoding section 780, and a second decoding section 790.

The demultiplexing section 770 demultiplexes a multiview multiplexed stream into an encoded stream of a base view and one or more encoded streams of non-base views. The first decoding section 780 decodes the encoded stream of the base view into base view images. The second decoding section 790 decodes the encoded streams of the non-base views into non-base view images.

The first decoding section 780 and the second decoding section 790 exemplified in FIG. 20 have a similar configuration to the image decoding device 60 according to an embodiment discussed earlier. Thus, it becomes possible to generate quantization matrices corresponding to non-square transform units to be used for each view from quantization matrices corresponding to square transform units. Parameters that control these processes may be acquired from the header area of the encoded stream for each view, or acquired from a shared header area in the multiplexed stream.

[5-2. Scalable Codec]

Figure 21:
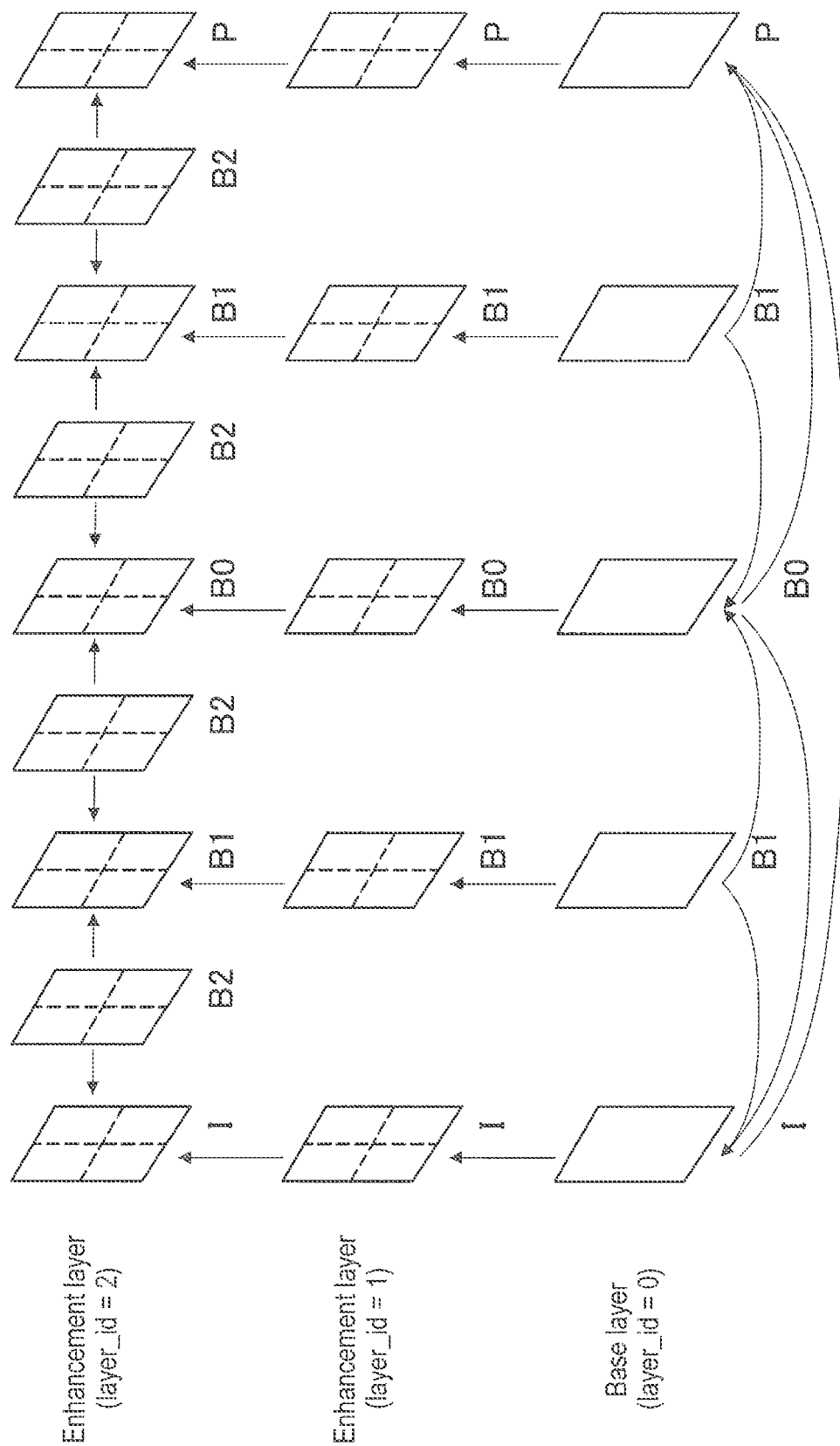
FIG. 21 is an explanatory diagram for explaining a scalable codec.

A scalable codec is an image coding scheme for realizing what is called scalable coding. FIG. 21 is an explanatory diagram for explaining a scalable codec. Referring to FIG. 21, frame sequences for three layers that differ in spatial resolution, temporal resolution, or quality are illustrated. Each layer is given a layer ID (layer_id). Of these multiple layers, the layer with the lowest resolution (or quality) is the base layer. The layers other than the base layer are called enhancement layers. In the example in FIG. 21, the layer with the layer ID "0" is the base layer, while the two layers with the layer IDs "1" and "2" are enhancement layers. When encoding this multilayer image data, the overall data size of the encoded stream may be compressed by encoding frames in the enhancement layers on the basis of encoding information for frames in the base layer.

In an encoding process and decoding process according to the above scalable codec, quantization matrices corresponding to non-square transform units may be generated from quantization matrices corresponding to square transform units. Control parameters of some kind (the parameters exemplified in FIG. 5, for example) may also be set for each layer in order to generate the quantization matrices to be used with each layer. Also, control parameters set in the base layer may be reused for enhancement layers. Also, a flag indicating whether or not to reuse control parameters across layers may be additionally specified.

Figure 22:
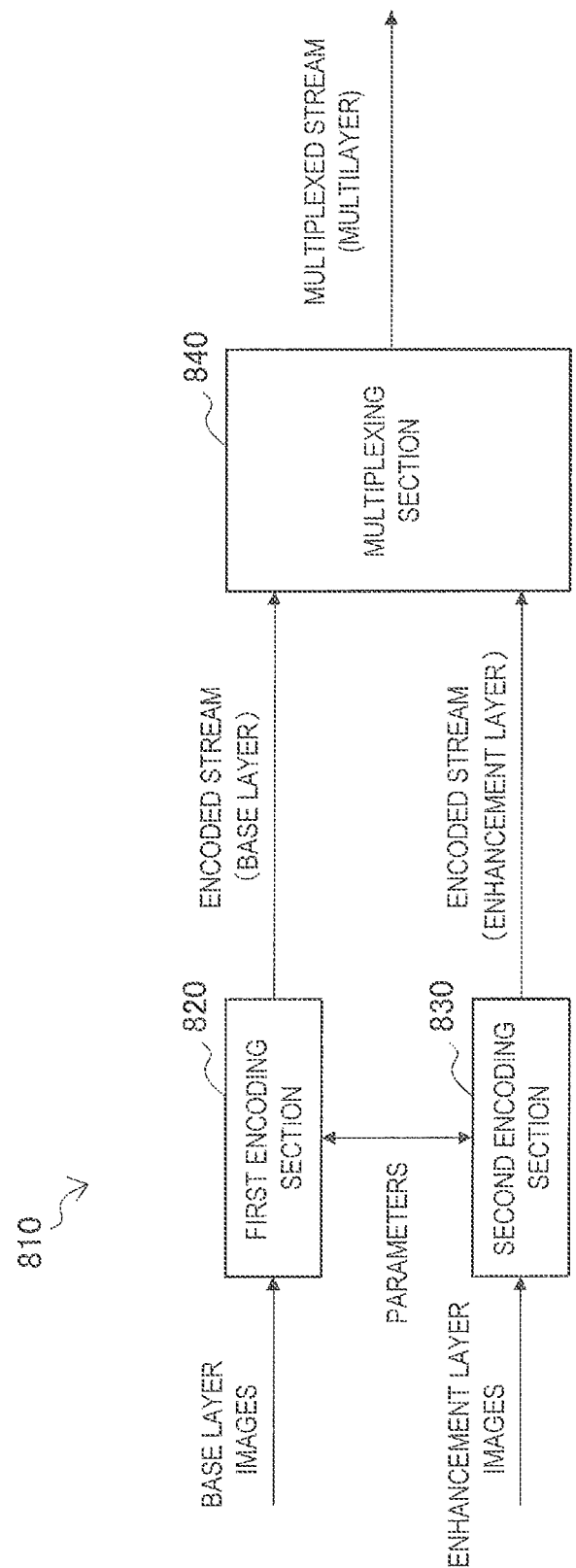
FIG. 22 is an explanatory diagram for explaining an application of an image encoding process according to an embodiment to a scalable codec.

FIG. 22 is an explanatory diagram for explaining an application of the earlier image encoding process to a scalable codec. Referring to FIG. 22, a configuration of a scalable encoding device 810 is illustrated as an example. The scalable encoding device 810 is equipped with a first encoding section 820, a second encoding section 830, and a multiplexing section 840.

The first encoding section 820 encodes base layer images, and generates an encoded stream of the base layer. The second encoding section 830 encodes enhancement layer images, and generates encoded streams of the enhancement layers. The multiplexing section 840 multiplexes the encoded stream of the base layer generated by the first encoding section 820 with the encoded streams of one or more enhancement layers generated by the second encoding section 830, and generates a multilayer multiplexed stream.

The first encoding section 820 and the second encoding section 830 exemplified in FIG. 22 have a similar configuration to the image encoding device 10 according to an embodiment discussed earlier. Thus, it becomes possible to generate quantization matrices corresponding to non-square transform units to be used for each layer from quantization matrices corresponding to square transform units. Parameters that control these processes may be inserted into the header area of the encoded stream for each layer, or inserted into a shared header area in the multiplexed stream.

Figure 23:
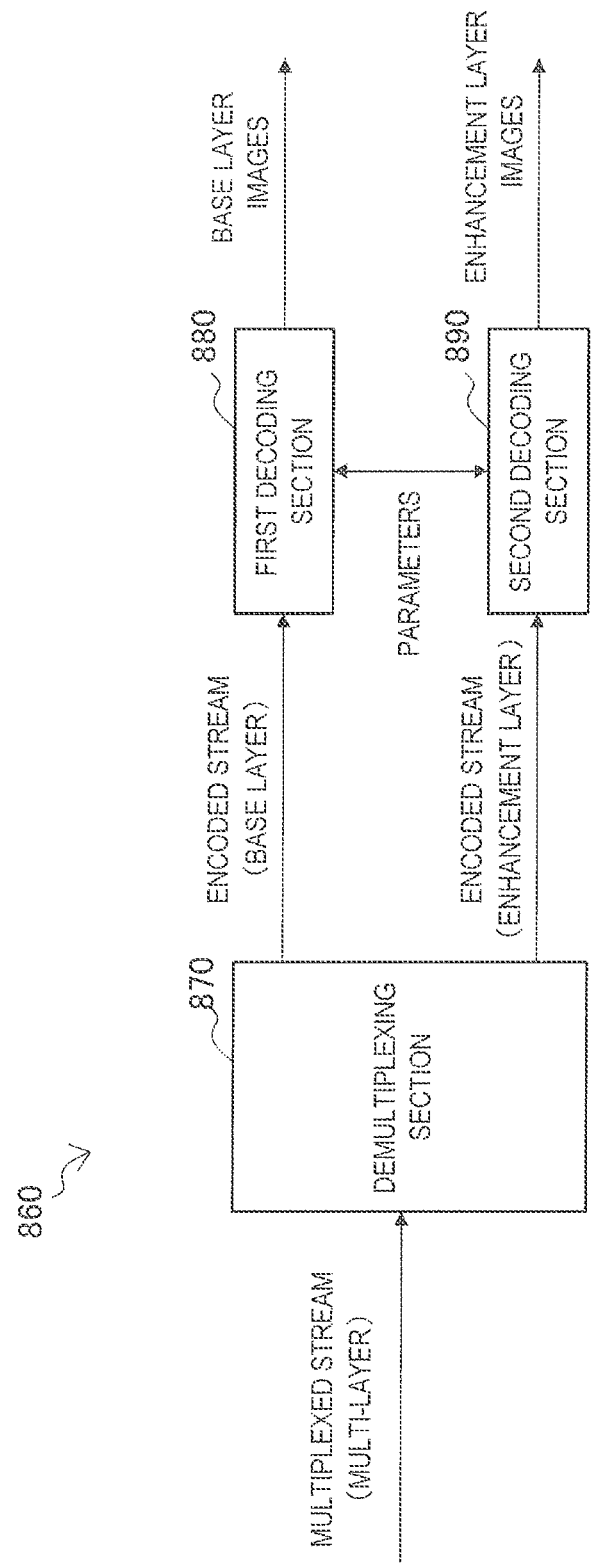
FIG. 23 is an explanatory diagram for explaining an application of an image encoding process according to an embodiment to a scalable codec.

FIG. 23 is an explanatory diagram for explaining an application of the earlier image decoding process to a scalable codec. Referring to FIG. 23, a configuration of a scalable decoding device 860 is illustrated as an example. The scalable decoding device 860 is equipped with a demultiplexing section 870, a first decoding section 880, and a second decoding section 890.

The demultiplexing section 870 demultiplexes a multilayer multiplexed stream into an encoded stream of a base layer and one or more encoded streams of enhancement layers. The first decoding section 880 decodes the encoded stream of the base layer into base layer images. The second decoding section 890 decodes the encoded streams of the enhancement layers into enhancement layer images.

The first decoding section 880 and the second decoding section 890 exemplified in FIG. 23 have a similar configuration to the image decoding device 60 according to an embodiment discussed earlier. Thus, it becomes possible to generate quantization matrices corresponding to non-square transform units to be used for each layer from quantization matrices corresponding to square transform units. Parameters that control these processes may be acquired from the header area of the encoded stream for each layer, or acquired from a shared header area in the multiplexed stream.

6. Example Application

The image encoding device 10 and the image decoding device 60 according to the embodiment described above may be applied to various electronic appliances such as a transmitter and a receiver for satellite broadcasting, cable broadcasting such as cable TV, distribution on the Internet, distribution to client devices via cellular communication, and the like, a recording device that records images onto a medium such as an optical disc, a magnetic disk, or flash memory, and a playback device that plays back images from such storage media. Four example applications will be described below.

[6-1. First Example Application]

Figure 24:
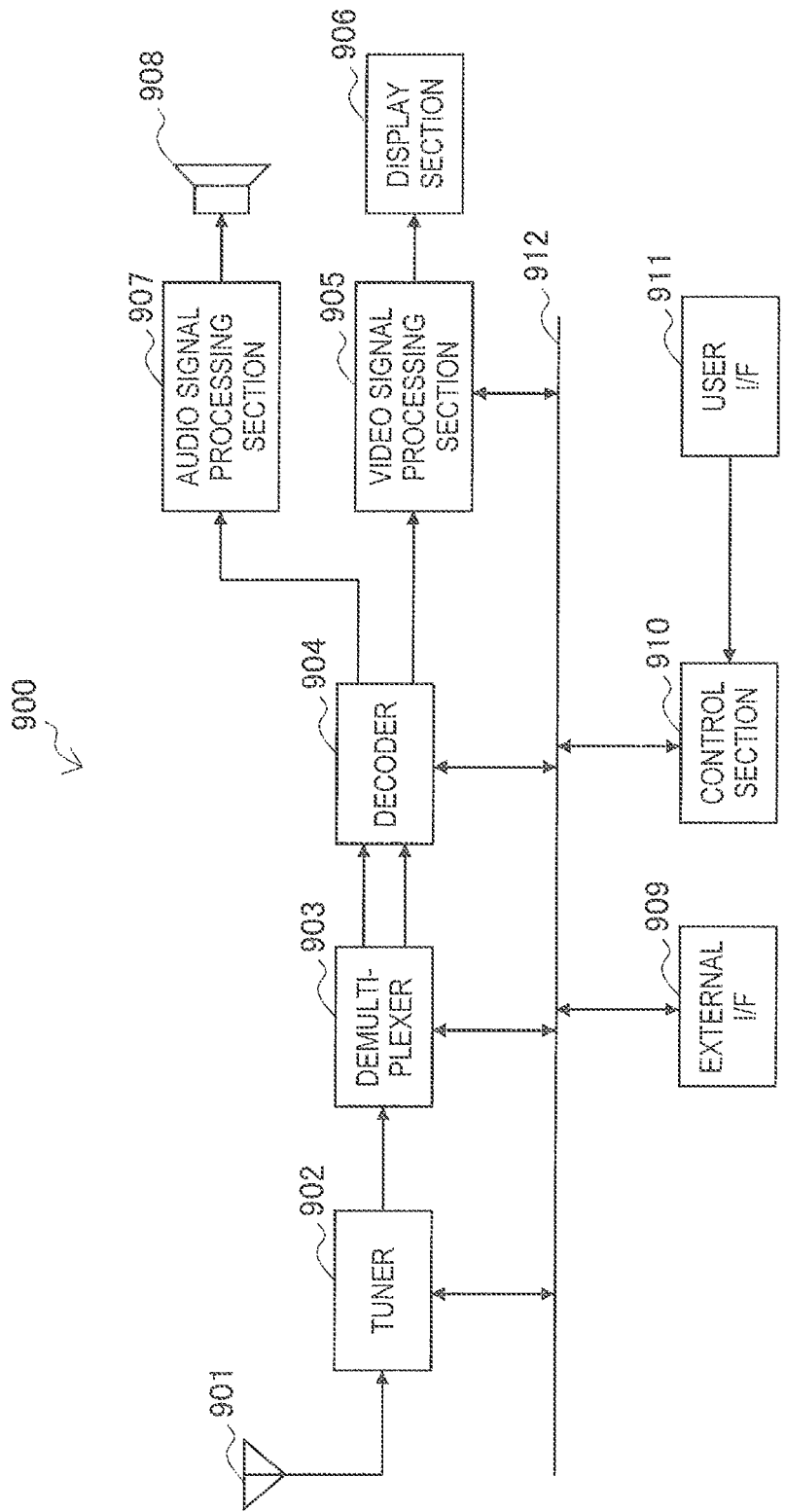
FIG. 24 is a block diagram illustrating an example of a schematic configuration of a television.

FIG. 24 is a block diagram illustrating an exemplary schematic configuration of a television adopting the embodiment described above. A television 900 includes an antenna 901, a tuner 902, a demultiplexer 903, a decoder 904, a video signal processing section 905, a display section 906, an audio signal processing section 907, a speaker 908, an external interface 909, a control section 910, a user interface 911, and a bus 912.

The tuner 902 extracts a signal of a desired channel from broadcast signals received via the antenna 901, and demodulates the extracted signal. Then, the tuner 902 outputs an encoded bit stream obtained by demodulation to the demultiplexer 903. That is, the tuner 902 serves as transmission means of the television 900 for receiving an encoded stream in which an image is encoded.

The demultiplexer 903 separates a video stream and an audio stream of a program to be viewed from the encoded bit stream, and outputs the separated streams to the decoder 904. Also, the demultiplexer 903 extracts auxiliary data such as an electronic program guide (EPG) from the encoded bit stream, and supplies the extracted data to the control section 910. Additionally, the demultiplexer 903 may perform descrambling in the case where the encoded bit stream is scrambled.

The decoder 904 decodes the video stream and the audio stream input from the demultiplexer 903. Then, the decoder 904 outputs video data generated by the decoding process to the video signal processing section 905. Also, the decoder 904 outputs the audio data generated by the decoding process to the audio signal processing section 907.

The video signal processing section 905 plays back the video data input from the decoder 904, and causes the display section 906 to display the video. The video signal processing section 905 may also cause the display section 906 to display an application screen supplied via a network. Further, the video signal processing section 905 may perform additional processes such as noise removal, for example, on the video data according to settings. Furthermore, the video signal processing section 905 may generate graphical user interface (GUI) images such as menus, buttons, or a cursor, for example, and superimpose the generated images onto an output image.

The display section 906 is driven by a drive signal supplied by the video signal processing section 905, and displays a video or an image on a video screen of a display device (such as a liquid crystal display, a plasma display, or an OLED display, for example).

The audio signal processing section 907 performs playback processes such as D/A conversion and amplification on the audio data input from the decoder 904, and outputs audio from the speaker 908. Also, the audio signal processing section 907 may perform additional processes such as noise removal on the audio data.

The external interface 909 is an interface for connecting the television 900 to an external appliance or a network. For example, a video stream or an audio stream received via the external interface 909 may be decoded by the decoder 904. That is, the external interface 909 also serves as transmission means of the televisions 900 for receiving an encoded stream in which an image is encoded.

The control section 910 includes a processor such as a central processing unit (CPU), and memory such as random access memory (RAM), and read-only memory (ROM). The memory stores a program to be executed by the CPU, program data, EPG data, data acquired via a network, and the like. The program stored in the memory is read and executed by the CPU when activating the television 900, for example. By executing the program, the CPU controls the operation of the television 900 according to an operation signal input from the user interface 911, for example.

The user interface 911 is connected to the control section 910. The user interface 911 includes buttons and switches used by a user to operate the television 900, and a remote control signal receiver, for example. The user interface 911 detects an operation by the user via these structural elements, generates an operation signal, and outputs the generated operation signal to the control section 910.

The bus 912 interconnects the tuner 902, the demultiplexer 903, the decoder 904, the video signal processing section 905, the audio signal processing section 907, the external interface 909, and the control section 910.

In a television 900 configured in this way, the decoder 904 includes the functions of an image decoding device 60 according to the foregoing embodiments. Consequently, it is possible to suppresses increases in the bit rate required to define quantization matrices for video to be decoded by the television 900, even in cases where non-square transform units may be used.

[6-2. Second Example Application]

Figure 25:
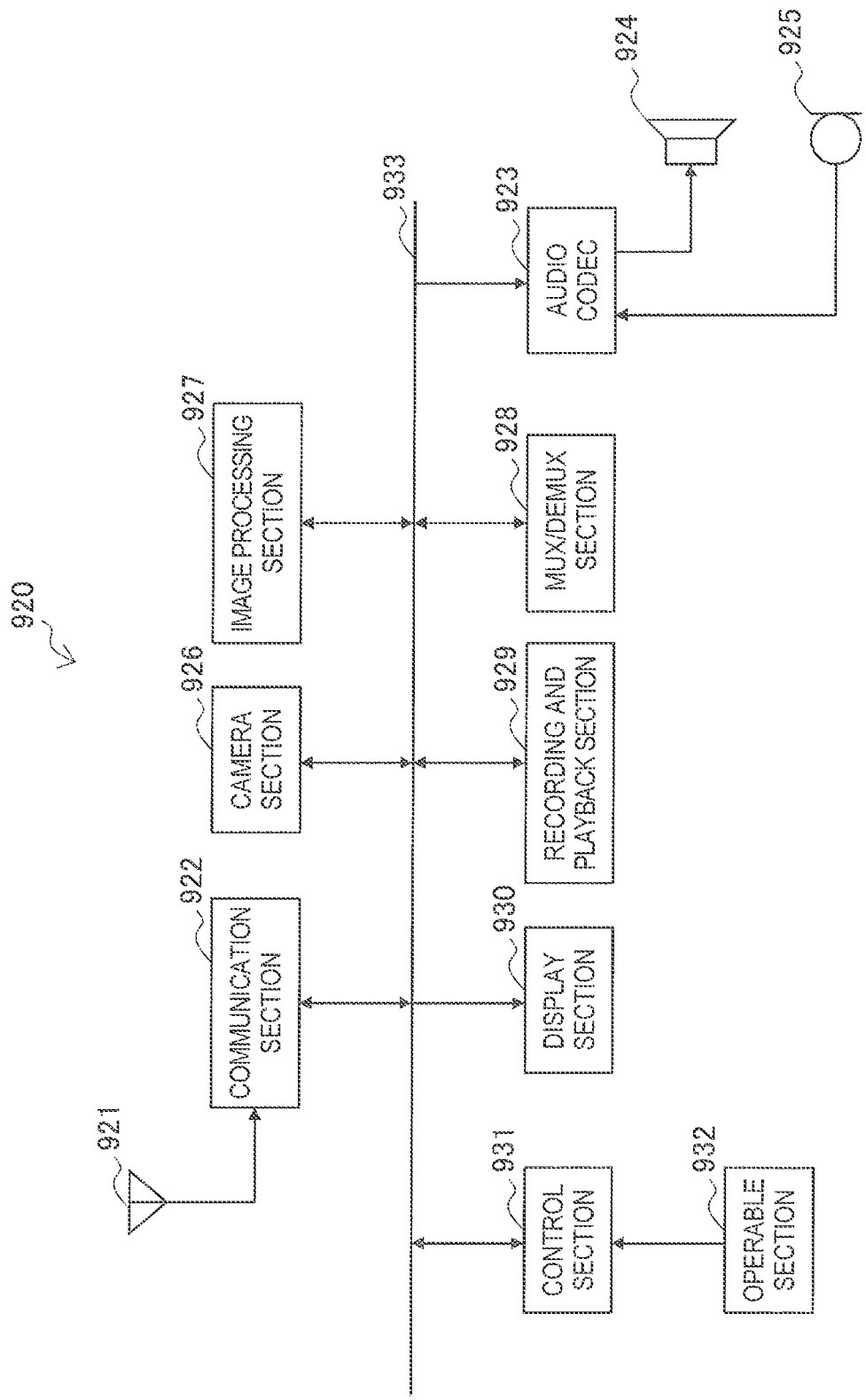
FIG. 25 is a block diagram illustrating an example of a schematic configuration of a mobile phone.

FIG. 25 is a block diagram illustrating an exemplary schematic configuration of a mobile phone adopting the embodiment described above. A mobile phone 920 includes an antenna 921, a communication section 922, an audio codec 923, a speaker 924, a microphone 925, a camera section 926, an image processing section 927, a multiplexing/demultiplexing (mux/demux) section 928, a recording and playback section 929, a display section 930, a control section 931, an operable section 932, and a bus 933.

The antenna 921 is connected to the communication section 922. The speaker 924 and the microphone 925 are connected to the audio codec 923. The operable section 932 is connected to the control section 931. The bus 933 interconnects the communication section 922, the audio codec 923, the camera section 926, the image processing section 927, the mux/demux section 928, the recording and playback section 929, the display 930, and the control section 931.

The mobile phone 920 performs operations such as transmitting and receiving audio signals, transmitting and receiving emails or image data, taking images, and recording data in various operating modes including an audio communication mode, a data communication mode, an imaging mode, and a videophone mode.

In the audio communication mode, an analog audio signal generated by the microphone 925 is supplied to the audio codec 923. The audio codec 923 converts the analog audio signal into audio data, and A/D converts and compresses the converted audio data. Then, the audio codec 923 outputs the compressed audio data to the communication section 922. The communication section 922 encodes and modulates the audio data, and generates a transmit signal. Then, the communication section 922 transmits the generated transmit signal to a base station (not illustrated) via the antenna 921. Also, the communication section 922 amplifies a wireless signal received via the antenna 921 and converts the frequency of the wireless signal, and acquires a received signal. Then, the communication section 922 demodulates and decodes the received signal and generates audio data, and outputs the generated audio data to the audio codec 923. The audio codec 923 decompresses and D/A converts the audio data, and generates an analog audio signal. Then, the audio codec 923 supplies the generated audio signal to the speaker 924 and causes audio to be output.

Also, in the data communication mode, the control section 931 generates text data that makes up an email, according to operations by a user via the operable section 932, for example. Moreover, the control section 931 causes the text to be displayed on the display section 930. Furthermore, the control section 931 generates email data according to transmit instructions from the user via the operable section 932, and outputs the generated email data to the communication section 922. The communication section 922 encodes and modulates the email data, and generates a transmit signal. Then, the communication section 922 transmits the generated transmit signal to a base station (not illustrated) via the antenna 921. Also, the communication section 922 amplifies a wireless signal received via the antenna 921 and converts the frequency of the wireless signal, and acquires a received signal. Then, the communication section 922 demodulates and decodes the received signal, reconstructs the email data, and outputs the reconstructed email data to the control section 931. The control section 931 causes the display section 930 to display the contents of the email, and also causes the email data to be stored in the storage medium of the recording and playback section 929.

The recording and playback section 929 includes an arbitrary readable and writable storage medium. For example, the storage medium may be a built-in storage medium such as RAM, or flash memory, or an externally mounted storage medium such as a hard disk, a magnetic disk, a magneto-optical disc, an optical disc, USB memory, or a memory card.

Furthermore, in the imaging mode, the camera section 926 takes an image of a subject, generates image data, and outputs the generated image data to the image processing section 927, for example. The image processing section 927 encodes the image data input from the camera section 926, and causes the encoded stream to be stored in the storage medium of the recording and playback section 929.

Furthermore, in the videophone mode, the mux/demux section 928 multiplexes a video stream encoded by the image processing section 927 and an audio stream input from the audio codec 923, and outputs the multiplexed stream to the communication section 922, for example. The communication section 922 encodes and modulates the stream, and generates a transmit signal. Then, the communication section 922 transmits the generated transmit signal to a base station (not illustrated) via the antenna 921. Also, the communication section 922 amplifies a wireless signal received via the antenna 921 and converts the frequency of the wireless signal, and acquires a received signal. The transmit signal and received signal may include an encoded bit stream. Then, the communication section 922 demodulates and decodes the received signal, reconstructs the stream, and outputs the reconstructed stream to the mux/demux section 928. The mux/demux section 928 separates a video stream and an audio stream from the input stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 decompresses and D/A converts the audio stream, and generates an analog audio signal. Then, the audio codec 923 supplies the generated audio signal to the speaker 924 and causes audio to be output.

In a mobile phone 920 configured in this way, the image processing section 927 includes the functions of the image encoding device 10 and the image decoding device 60 according to the foregoing embodiments. Consequently, it is possible to suppresses increases in the bit rate required to define quantization matrices for video encoded and decoded by the mobile phone 920, even in cases where non-square transform units may be used.

[6-3. Third Example Application]

Figure 26:
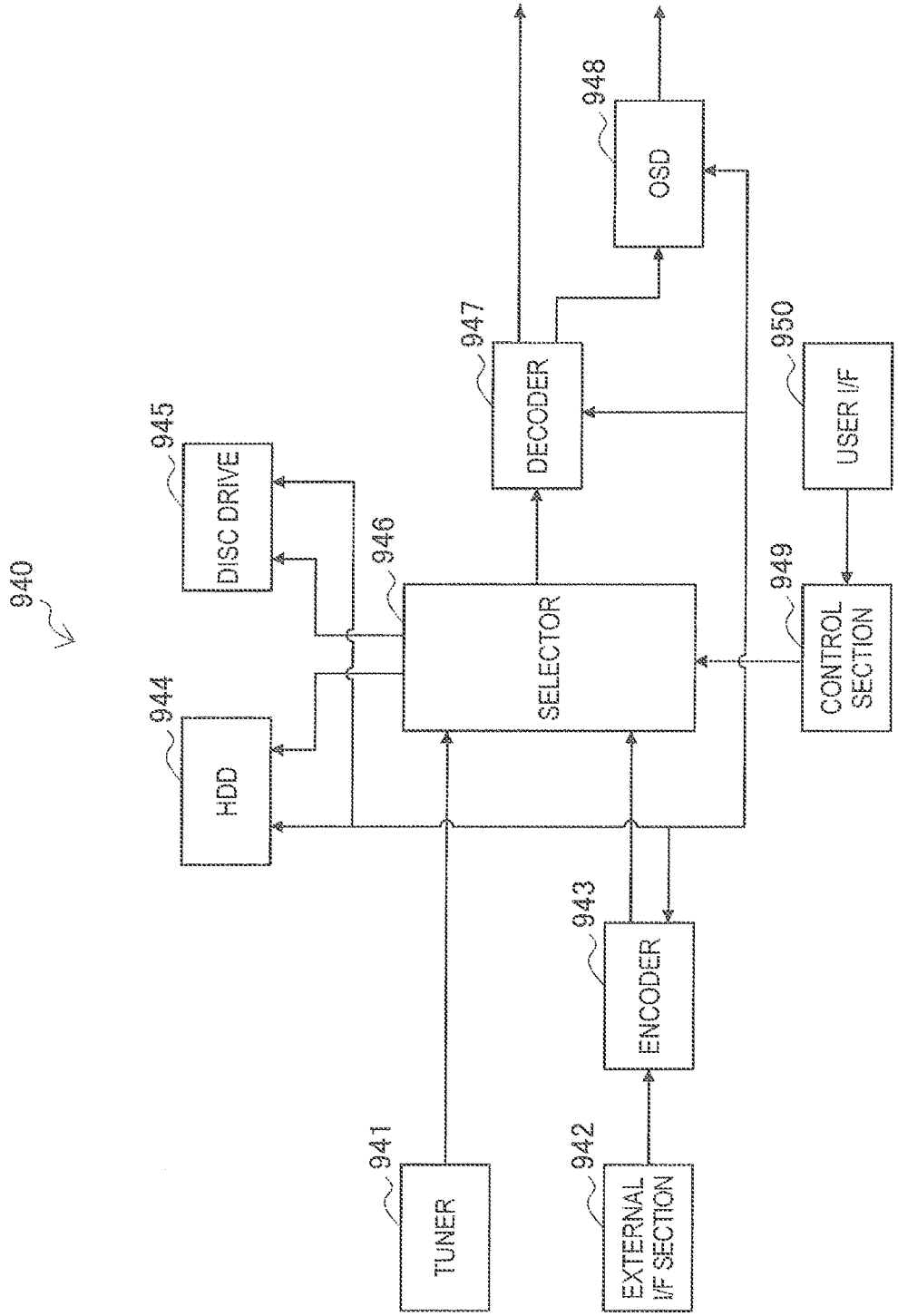
FIG. 26 is a block diagram illustrating an example of a schematic configuration of a recording and playback device.

FIG. 26 is a block diagram illustrating an exemplary schematic configuration of a recording and playback device adopting the embodiment described above. A recording and playback device 940 encodes, and records onto a recording medium, the audio data and video data of a received broadcast program, for example. The recording and playback device 940 may also encode, and record onto the recording medium, audio data and video data acquired from another device, for example. Furthermore, the recording and playback device 940 plays back data recorded onto the recording medium via a monitor and speaker according to instructions from a user, for example. At such times, the recording and playback device 940 decodes the audio data and the video data.

The recording and playback device 940 includes a tuner 941, an external interface 942, an encoder 943, a hard disk drive (HDD) 944, a disc drive 945, a selector 946, a decoder 947, an on-screen display (OSD) 948, a control section 949, and a user interface 950.

The tuner 941 extracts a signal of a desired channel from broadcast signals received via an antenna (not illustrated), and demodulates the extracted signal. Then, the tuner 941 outputs an encoded bit stream obtained by demodulation to the selector 946. That is, the tuner 941 serves as transmission means of the recording and playback device 940.

The external interface 942 is an interface for connecting the recording and playback device 940 to an external appliance or a network. For example, the external interface 942 may be an IEEE 1394 interface, a network interface, a USB interface, a flash memory interface, or the like. For example, video data and audio data received by the external interface 942 are input into the encoder 943. That is, the external interface 942 serves as transmission means of the recording and playback device 940.

In the case where the video data and the audio data input from the external interface 942 are not encoded, the encoder 943 encodes the video data and the audio data. Then, the encoder 943 outputs the encoded bit stream to the selector 946.

The HDD 944 records onto an internal hard disk an encoded bit stream, which is compressed content data such as video or audio, various programs, and other data. Also, the HDD 944 reads such data from the hard disk when playing back video and audio.

The disc drive 945 records or reads data with respect to an inserted recording medium. The recording medium inserted into the disc drive 945 may be a DVD disc (such as a DVD-Video, DVD-RAM, DVD-R, DVD-RW, DVD+, or DVD+RW disc), a Blu-ray (registered trademark) disc, or the like, for example.

When recording video and audio, the selector 946 selects an encoded bit stream input from the tuner 941 or the encoder 943, and outputs the selected encoded bit stream to the HDD 944 or the disc drive 945. Also, when playing back video and audio, the selector 946 outputs an encoded bit stream input from the HDD 944 or the disc drive 945 to the decoder 947.

The decoder 947 decodes the encoded bit stream, and generates video data and audio data. Then, the decoder 947 outputs the generated video data to the OSD 948. Also, the decoder 904 outputs the generated audio data to an external speaker.

The OSD 948 plays back the video data input from the decoder 947, and displays video. Also, the OSD 948 may superimpose GUI images, such as menus, buttons, or a cursor, for example, onto displayed video.

The control section 949 includes a processor such as a CPU, and memory such as RAM or ROM. The memory stores a program to be executed by the CPU, program data, and the like. A program stored in the memory is read and executed by the CPU when activating the recording and playback device 940, for example. By executing the program, the CPU controls the operation of the recording and playback device 940 according to an operation signal input from the user interface 950, for example.

The user interface 950 is connected to the control section 949. The user interface 950 includes buttons and switches used by a user to operate the recording and playback device 940, and a remote control signal receiver, for example. The user interface 950 detects an operation by the user via these structural elements, generates an operation signal, and outputs the generated operation signal to the control section 949.

In a recording and playback device 940 configured in this way, the encoder 943 includes the functions of the image encoding device 10 according to the foregoing embodiments. In addition, the decoder 947 includes the functions of the image decoding device 60 according to the foregoing embodiments. Consequently, it is possible to suppresses increases in the bit rate required to define quantization matrices for video encoded and decoded by the recording and playback device 940, even in cases where non-square transform units may be used.

[6-4. Fourth Example Application]

Figure 27:
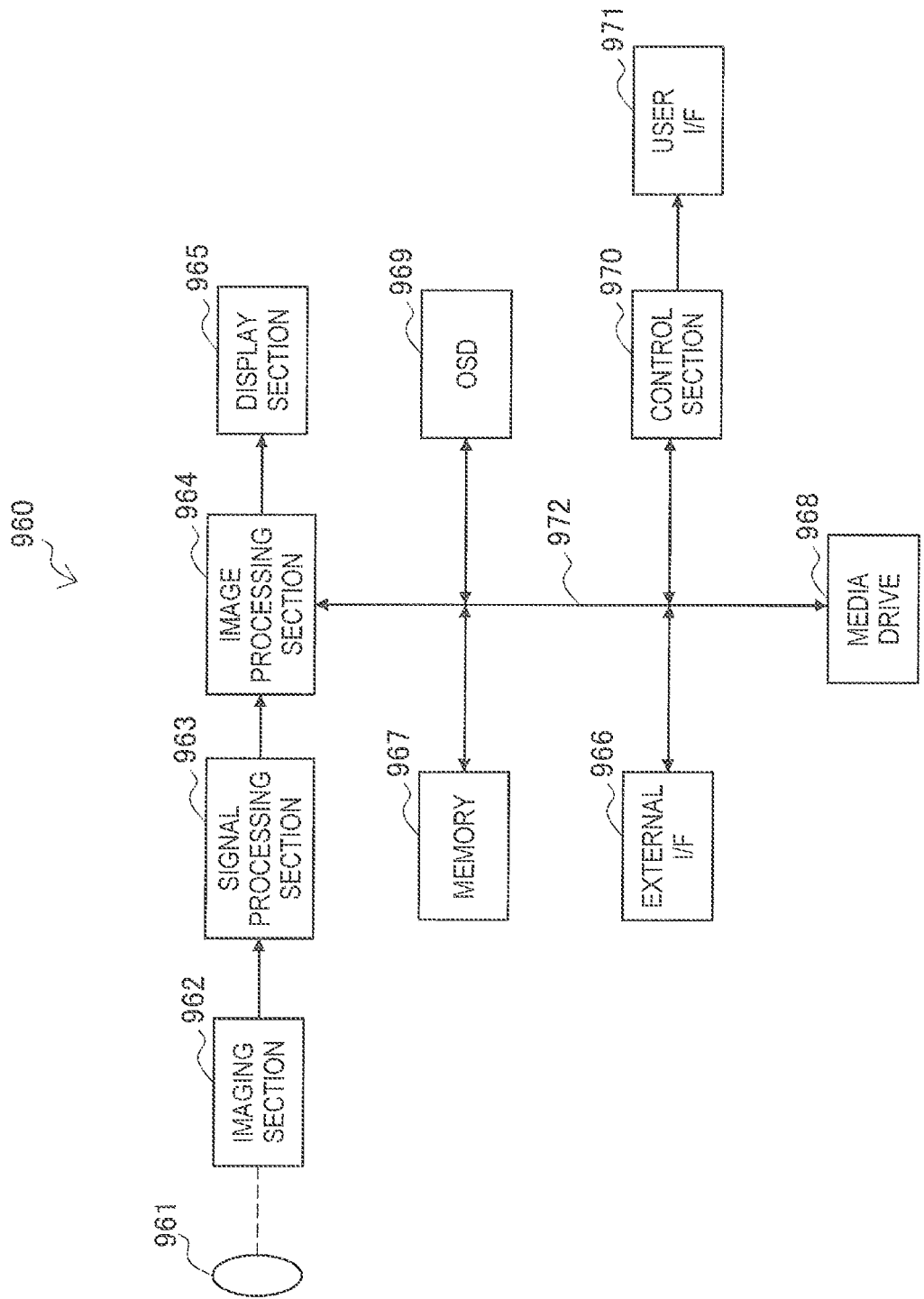
FIG. 27 is a block diagram illustrating an example of a schematic configuration of an imaging device.

FIG. 27 is a block diagram showing an example of a schematic configuration of an imaging device adopting the embodiment described above. An imaging device 960 takes an image of a subject, generates an image, encodes the image data, and records the image data onto a recording medium.

The imaging device 960 includes an optical block 961, an imaging section 962, a signal processing section 963, an image processing section 964, a display section 965, an external interface 966, memory 967, a media drive 968, an OSD 969, a control section 970, a user interface 971, and a bus 972.

The optical block 961 is connected to the imaging section 962. The imaging section 962 is connected to the signal processing section 963. The display section 965 is connected to the image processing section 964. The user interface 971 is connected to the control section 970. The bus 972 interconnects the image processing section 964, the external interface 966, the memory 967, the media drive 968, the OSD 969, and the control section 970.

The optical block 961 includes a focus lens, an aperture stop mechanism, and the like. The optical block 961 forms an optical image of a subject on the imaging surface of the imaging section 962. The imaging section 962 includes an image sensor such as a CCD or CMOS sensor, and photo-electrically converts the optical image formed on the imaging surface into an image signal which is an electrical signal. Then, the imaging section 962 outputs the image signal to the signal processing section 963.

The signal processing section 963 performs various camera signal processes such as knee correction, gamma correction, and color correction on the image signal input from the imaging section 962. The signal processing section 963 outputs the processed image data to the image processing section 964.

The image processing section 964 encodes the image data input from the signal processing section 963, and generates encoded data. Then, the image processing section 964 outputs the encoded data thus generated to the external interface 966 or the media drive 968. Also, the image processing section 964 decodes encoded data input from the external interface 966 or the media drive 968, and generates image data. Then, the image processing section 964 outputs the generated image data to the display section 965. Also, the image processing section 964 may output the image data input from the signal processing section 963 to the display section 965, and cause the image to be displayed. Furthermore, the image processing section 964 may superimpose display data acquired from the OSD 969 onto an image to be output to the display section 965.

The OSD 969 generates GUI images such as menus, buttons, or a cursor, for example, and outputs the generated images to the image processing section 964.

The external interface 966 is configured as an USB input/output terminal, for example. The external interface 966 connects the imaging device 960 to a printer when printing an image, for example. Also, a drive is connected to the external interface 966 as necessary. A removable medium such as a magnetic disk or an optical disc, for example, is inserted into the drive, and a program read from the removable medium may be installed in the imaging device 960. Furthermore, the external interface 966 may be configured as a network interface to be connected to a network such as a LAN or the Internet. That is, the external interface 966 serves as transmission means of the image capturing device 960.

A recording medium to be inserted into the media drive 968 may be an arbitrary readable and writable removable medium, such as a magnetic disk, a magneto-optical disc, an optical disc, or semiconductor memory, for example. Also, a recording medium may be permanently installed in the media drive 968 to constitute a non-portable storage section such as an internal hard disk drive or a solid-state drive (SSD), for example.

The control section 970 includes a processor such as a CPU, and memory such as RAM or ROM. The memory stores a program to be executed by the CPU, program data, and the like. A program stored in the memory is read and executed by the CPU when activating the imaging device 960, for example. By executing the program, the CPU controls the operation of the imaging device 960 according to an operation signal input from the user interface 971, for example.

The user interface 971 is connected to the control section 970. The user interface 971 includes buttons, switches and the like used by a user to operate the imaging device 960, for example. The user interface 971 detects an operation by the user via these structural elements, generates an operation signal, and outputs the generated operation signal to the control section 970.

In an imaging device 960 configured in this way, the image processing section 964 includes the functions of the image encoding device 10 and the image decoding device 60 according to the foregoing embodiments. Consequently, it is possible to suppresses increases in the bit rate required to define quantization matrices for video encoded and decoded by the imaging device 960, even in cases where non-square transform units may be used.

7. Conclusion

The foregoing uses FIGS. 1, 2, 3, 4, 5, 6A, 6B, 6C, 7, 8A, 8B, 9, 10, 11, 12, 13, 14, 15, 16, 17, 18, 19, 20, 21, 22, 23, 24, 25, 26 and 27 to describe an image encoding device 10 and an image decoding device 60 according to an embodiment. According to the foregoing embodiments, when quantizing and inversely quantizing transform coefficient data, a quantization matrix is set for each transform unit, in correspondence with the shape of the transform unit. The shapes of transform units are square or non-square, and quantization matrices corresponding to non-square transform units may be generated from quantization matrices corresponding to square transform units. Consequently, it is possible to partially omit the definition of quantization matrices corresponding to non-square transform units, or efficiently (that it, with a lower bit rate) define quantization matrices corresponding to non-square transform units. For this reason, it is possible to avoid a significant lowering of coding efficiency due to an increase in the selectable types of transform units, even in the case of implementing a scheme enabling the selection of non-square transform units.

Also, according to the embodiments, a non-square quantization matrix whose long edge is equal in size to an edge of a given square quantization matrix may be generated by copying some rows or columns from the square quantization matrix. Consequently, it is possible to easily generate a non-square quantization matrix by only repeating the extremely low-cost processing operation of copying element values.

Also, according to the embodiments, the rows or columns to copy from a square quantization matrix may be flexibly specified in a parameter set or header of the encoded stream. Consequently, it is possible, via the above copying, to generate quantization matrices suitable for quantizing and inversely quantizing the transform coefficient data of non-square transform units. Meanwhile, in the case where the rows and columns to copy from a square quantization matrix are predefined, it is possible to decrease the number of quantization matrix parameters to encode and reduce transmission overhead, while also lowering device complexity.

Note that this specification describes an example in which the quantization matrix parameter multiplexed into the header of the encoded stream and transmitted from the encoding side to the decoding side. However, the technique of transmitting the quantization matrix parameter is not limited to such an example. For example, header information may also be transmitted or recorded as separate data associated with an encoded bit stream without being multiplexed into the encoded bit stream. Herein, the term "associated" means that images included in the bit stream (also encompassing partial images such as slices or blocks) and information corresponding to those images can be linked at the time of decoding. In other words, information may also be transmitted on a separate transmission channel from an image (or bit stream). Also, the information may be recorded to a separate recording medium (or a separate recording area on the same recording medium) from the image (or bit stream). Furthermore, information and images (or bit streams) may be associated with each other in arbitrary units such as multiple frames, single frames, or portions within frames, for example.

The foregoing thus describes preferred embodiments of the present disclosure in detail and with reference to the attached drawings. However, the technical scope of the present disclosure is not limited to such examples. It is clear to persons ordinarily skilled in the technical field to which the present disclosure belongs that various modifications or alterations may occur insofar as they are within the scope of the technical ideas stated in the claims, and it is to be understood that such modifications or alterations obviously belong to the technical scope of the present disclosure. Additionally, the present technology may also be configured as below.

(1)
An image processing device including: a decoding section that decodes an encoded stream and generates quantized transform coefficient data; and
an inverse quantization section that, taking transform coefficient data as transform units to be used during inverse orthogonal transform, inversely quantizes the quantized transform coefficient data decoded by the decoding section, such that in a case where a non-square transform unit is selected, the inverse quantization section uses a non-square quantization matrix, corresponding to a non-square transform unit, that is generated from a square quantization matrix corresponding to a square transform unit.

(2)
The image processing device according to (1), wherein the non-square quantization matrix is generated by copying one of row elements and column elements of the square quantization matrix.

(3)
The image processing device according to (2), wherein a size of a long edge of the non-square quantization matrix is equal to a size of an edge of the square quantization matrix.

(4)
The image processing device according to (2) or (3), wherein
one of row elements and column elements to be copied from the square quantization matrix are predefined.

(5)
The image processing device according to any one of (2) to (4), wherein
the non-square quantization matrix is generated by copying one of row elements and column elements of the square quantization matrix at an equal interval.

(6)
The image processing device according to (5), wherein an interval of one of row elements and column elements to be copied from the square quantization matrix is determined according to a ratio of a size of a short edge of the non-square quantization matrix versus a size of an edge of the square quantization matrix.

(7)
The image processing device according to (6), wherein the ratio is 1:4, and the interval is one of four rows and four columns.

(8)
The image processing device according to (7), wherein a size of the square quantization matrix is 4×4, and a size of the non-square quantization matrix is one of 1×4 and 4×1.

(9)
The image processing device according to (7), wherein a size of the square quantization matrix is 8×8, and a size of the non-square quantization matrix is one of 2×8 and 8×2.

(10)
The image processing device according to (7), wherein a size of the square quantization matrix is 16×16, and a size of the non-square quantization matrix is one of 4×16 and 16×4.

(11)
The image processing device according to (7), wherein a size of the square quantization matrix is 32×32, and a size of the non-square quantization matrix is one of 8×32 and 32×8.

(12)
The image processing device according to any one of (2) to (11), further including:
a generation section that generates the non-square quantization matrix from the square quantization matrix.

(13)
The image processing device according to any one of (2) to (12), further including:
an inverse orthogonal transform section that inverse orthogonally transforms the transform coefficient data inversely quantized by the inverse quantization section by using the selected non-square transform unit.

(14)

An image processing method including:

decoding an encoded stream and generating quantized transform coefficient data; and taking transform coefficient data as transform units to be used during inverse orthogonal transform, inversely quantizing the decoded quantized transform coefficient data, such that in a case where a non-square transform unit is selected, a non-square quantization matrix corresponding to a non-square transform unit is used, the non-square quantization matrix being generated from a square quantization matrix corresponding to a square transform unit.

REFERENCE SIGNS LIST

10 Image processing device (image encoding device)
15 Orthogonal transform section
152 Transform unit setting section
16 Quantization section
17 Lossless encoding section
60 Image decoding device
63 Inverse quantization section
214 Generation section
242 Transform unit setting section

What is claimed is:

1. An image processing device, comprising:
a processor configured to:
decode an encoded stream to generate quantized transform coefficient data;
inversely quantize the quantized transform coefficient data corresponding to a non-square block, wherein
the quantized transform coefficient data is inversely quantized based on a non-square quantization matrix that is set by copy of one of row elements of a square quantization matrix or column elements of the square quantization matrix at an equal interval,
an interval of the one of the row elements of the square quantization matrix or the column elements of the square quantization matrix is based on a ratio of a size of a short edge of the non-square quantization matrix and a size of an edge of the square quantization matrix, and
the square quantization matrix corresponds to a square block;
generate transform coefficient data based on the inverse quantization of the quantized transform coefficient data; and
inversely transform the transform coefficient data corresponding to the non-square block.

2. The image processing device according to claim 1, wherein a size of a long edge of the non-square quantization matrix is equal to the size of the edge of the square quantization matrix.

3. The image processing device according to claim 1, wherein the one of the row elements of the square quantization matrix or the column elements of the square quantization matrix correspond to a specific position associated with the square quantization matrix.

4. The image processing device according to claim 1, wherein
the ratio is 1:4, and
the interval is one of four rows or four columns.

5. The image processing device according to claim 4, wherein a size of the square quantization matrix is 4×4, and a size of the non-square quantization matrix is one of 1×4 or 4×1.

6. The image processing device according to claim 4, wherein a size of the square quantization matrix is 8×8, and a size of the non-square quantization matrix is one of 2×8 or 8×2.

7. The image processing device according to claim 4, wherein a size of the square quantization matrix is 16×16, and a size of the non-square quantization matrix is one of 4×16 or 16×4.

8. The image processing device according to claim 4, wherein a size of the square quantization matrix is 32×32, and a size of the non-square quantization matrix is one of 8×32 or 32×8.

9. An image processing method, comprising:
decoding an encoded stream to generate quantized transform coefficient data;
inversely quantizing the quantized transform coefficient data corresponding to a non-square block, wherein
the quantized transform coefficient data is inversely quantized based on a non-square quantization matrix that is set based on a copy of one of row elements of a square quantization matrix or column elements of the square quantization matrix at an equal interval,
an interval of the one of the row elements of the square quantization matrix or the column elements of the square quantization matrix is based on a ratio of a size of a short edge of the non-square quantization matrix and a size of an edge of the square quantization matrix, and
the square quantization matrix corresponds to a square block;
generating transform coefficient data based on the inverse quantization of the quantized transform coefficient data; and
inversely transforming the transform coefficient data corresponding to the non-square block.

10. The image processing method according to claim 9, wherein a size of a long edge of the non-square quantization matrix is equal to the size of the edge of the square quantization matrix.

11. The image processing method according to claim 9, wherein the one of the row elements of the square quantization matrix or the column elements of the square quantization matrix correspond to a specific position associated with the square quantization matrix.

12. The image processing method according to claim 9, wherein
the ratio is 1:4, and
the interval is one of four rows or four columns.

13. The image processing method according to claim 12, wherein a size of the square quantization matrix is 4×4, and a size of the non-square quantization matrix is one of 1×4 or 4×1.

14. The image processing method according to claim 12, wherein a size of the square quantization matrix is 8×8, and a size of the non-square quantization matrix is one of 2×8 or 8×2.

15. The image processing method according to claim 12, wherein a size of the square quantization matrix is 16×16, and a size of the non-square quantization matrix is one of 4×16 or 16×4.

16. The image processing method according to claim 12, wherein a size of the square quantization matrix is 32×32, and a size of the non-square quantization matrix is one of 8×32 or 32×8.

17. An image processing device, comprising:
 a processor configured to:
  decode an encoded stream to generate quantized transform coefficient data;
  inversely quantize the quantized transform coefficient data corresponding to a non-square block, wherein
   the quantized transform coefficient data is inversely quantized based on a non-square quantization matrix that is set by copy of one of row elements of a square quantization matrix or column elements of the square quantization matrix,
   an interval of the one of the row elements or the column elements of the square quantization matrix is based on a ratio of a size of a short edge of the non-square quantization matrix and a size of an edge of the square quantization matrix, and
   the square quantization matrix corresponds to a square block;
  generate transform coefficient data based on the inverse quantization of the quantized transform coefficient data; and
  inversely transform the transform coefficient data corresponding to the non-square block.

* * * * *